(12) United States Patent
Hwang et al.

(10) Patent No.: US 11,776,405 B2
(45) Date of Patent: Oct. 3, 2023

(54) APPARATUS AND METHOD FOR V2X COMMUNICATION

(71) Applicant: LG ELECTRONICS INC., Seoul (KR)

(72) Inventors: Jaeho Hwang, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/289,101

(22) PCT Filed: Oct. 29, 2018

(86) PCT No.: PCT/KR2018/012935
§ 371 (c)(1),
(2) Date: Apr. 27, 2021

(87) PCT Pub. No.: WO2020/091088
PCT Pub. Date: May 7, 2020

(65) Prior Publication Data
US 2022/0005353 A1 Jan. 6, 2022

(51) Int. Cl.
G08G 1/16 (2006.01)
H04W 4/38 (2018.01)
H04W 4/40 (2018.01)
G08G 1/052 (2006.01)

(52) U.S. Cl.
CPC .............. G08G 1/162 (2013.01); G08G 1/052 (2013.01); H04W 4/38 (2018.02); H04W 4/40 (2018.02)

(58) Field of Classification Search
None
See application file for complete search history.

(56) References Cited

U.S. PATENT DOCUMENTS

| | | | |
|---|---|---|---|
| 8,352,111 B2 | 1/2013 | Mudalige | |
| 9,688,199 B2* | 6/2017 | Koravadi | E05F 15/73 |
| 9,959,753 B2* | 5/2018 | Jeng | G08G 1/091 |
| 10,091,760 B2* | 10/2018 | Lee | H04W 4/40 |
| 10,794,992 B2* | 10/2020 | Farmer | G01S 7/4026 |
| 2005/0015316 A1* | 1/2005 | Salluzzo | G06Q 40/12 |
| | | | 705/30 |

(Continued)

OTHER PUBLICATIONS

3rd Generation Partnership Project, Technical Specification Group Services and System Aspects; Study on Enhancement of 3GPP Support for 5G V2X Services (Release 16), 3GPP TR 22.886 V16.1.0, Sep. 21, 2018, See section 5.9.

*Primary Examiner* — Muhammad Adnan
(74) *Attorney, Agent, or Firm* — BRYAN CAVE LEIGHTON PAISNER LLP

(57) ABSTRACT

A method of transmitting a CPM message by a V2X communication device of a vehicle is disclosed. The method includes detecting at least one surrounding object; based on whether a state of the detected object satisfies a preset trigger condition of a collective perception (CP) message, generating the CP message including information on the detected object; and transmitting the CP message, wherein the CP message is generated when the state of the detected object satisfies the trigger condition, or is generated when the state of the detected object does not satisfy the trigger condition and a specific time has passed after the previously transmitted CP message is generated.

10 Claims, 19 Drawing Sheets

(56) References Cited

U.S. PATENT DOCUMENTS

| | | | |
|---|---|---|---|
| 2011/0080302 A1* | 4/2011 | Muthaiah | H04W 12/069 340/903 |
| 2012/0065858 A1* | 3/2012 | Nickolaou | B60Q 9/008 701/1 |
| 2012/0194356 A1* | 8/2012 | Haines | G08G 1/161 340/933 |
| 2013/0127638 A1* | 5/2013 | Harrison | G08G 1/166 340/903 |
| 2013/0322688 A1* | 12/2013 | Tsuchiya | G08G 1/167 382/103 |
| 2014/0119210 A1* | 5/2014 | Bansal | H04L 47/263 370/252 |
| 2015/0251599 A1* | 9/2015 | Koravadi | G01S 19/42 340/903 |
| 2015/0327028 A1 | 11/2015 | Zhang et al. | |
| 2016/0342850 A1* | 11/2016 | Elimalech | G08G 1/161 |
| 2017/0024621 A1 | 1/2017 | Thompson et al. | |
| 2017/0053530 A1* | 2/2017 | Gogic | H04W 4/46 |
| 2018/0075747 A1* | 3/2018 | Pahwa | B60W 40/10 |
| 2018/0122240 A1* | 5/2018 | Shirosaki | H04W 8/005 |
| 2018/0156624 A1* | 6/2018 | Bai | G08G 1/0129 |
| 2018/0365909 A1* | 12/2018 | Cheng | H04L 67/12 |
| 2020/0029245 A1* | 1/2020 | Khoryaev | H04W 36/22 |
| 2020/0229209 A1* | 7/2020 | Sorrentino | H04W 72/569 |
| 2020/0342755 A1* | 10/2020 | Nguyen | G08G 1/096783 |
| 2021/0084460 A1* | 3/2021 | Yang | G08G 1/22 |
| 2022/0130254 A1* | 4/2022 | Austin | B60Q 1/2611 |
| 2022/0299593 A1* | 9/2022 | Abir | G06N 20/00 |
| 2022/0322094 A1* | 10/2022 | Maschue | H04W 12/106 |

\* cited by examiner

[FIG. 1]
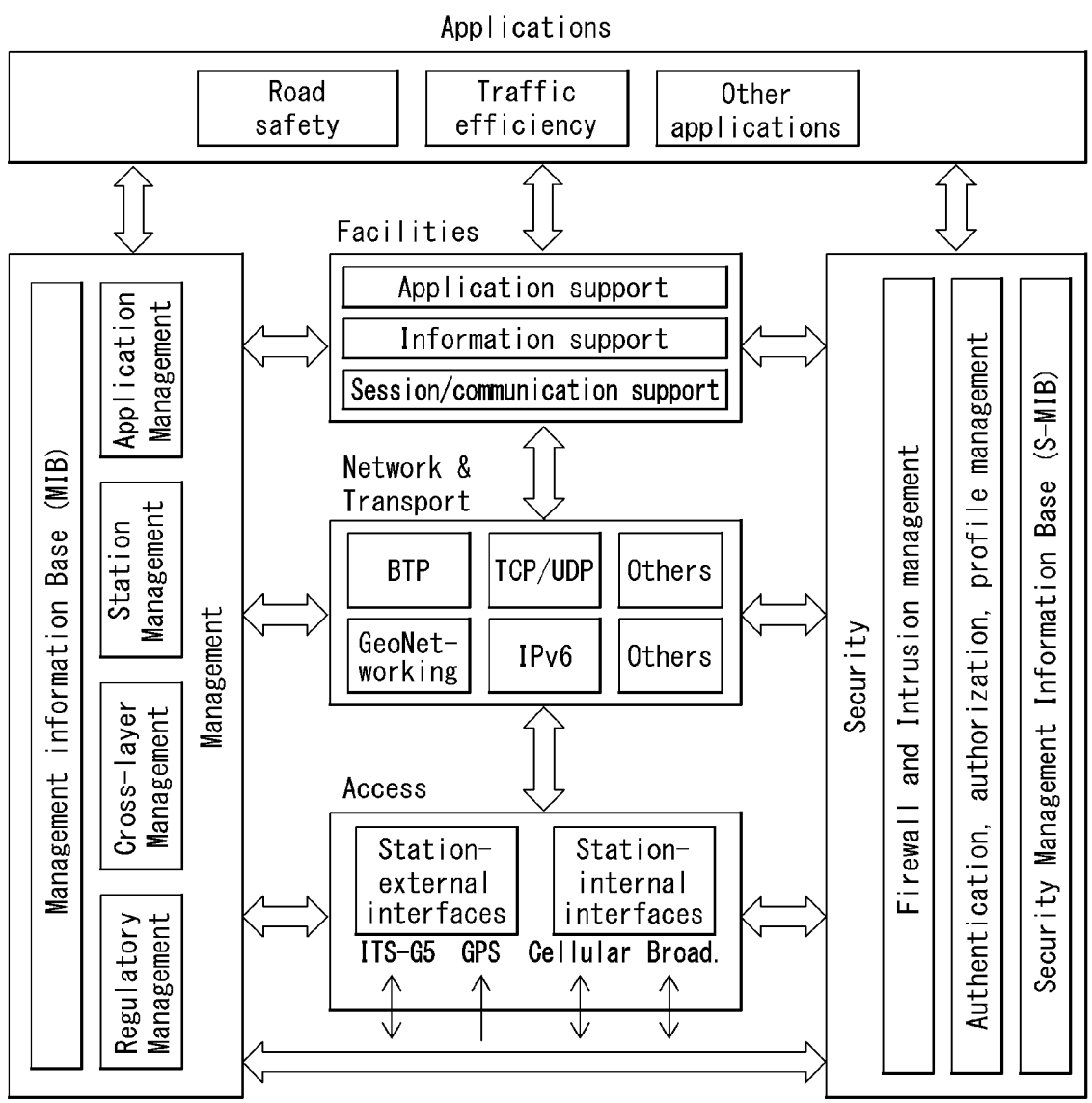

[FIG. 2]
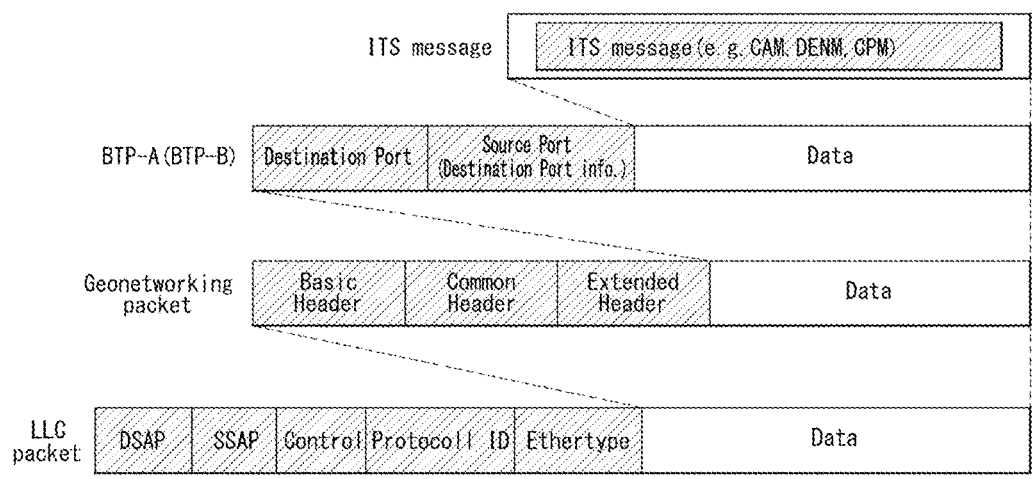

[FIG. 3]
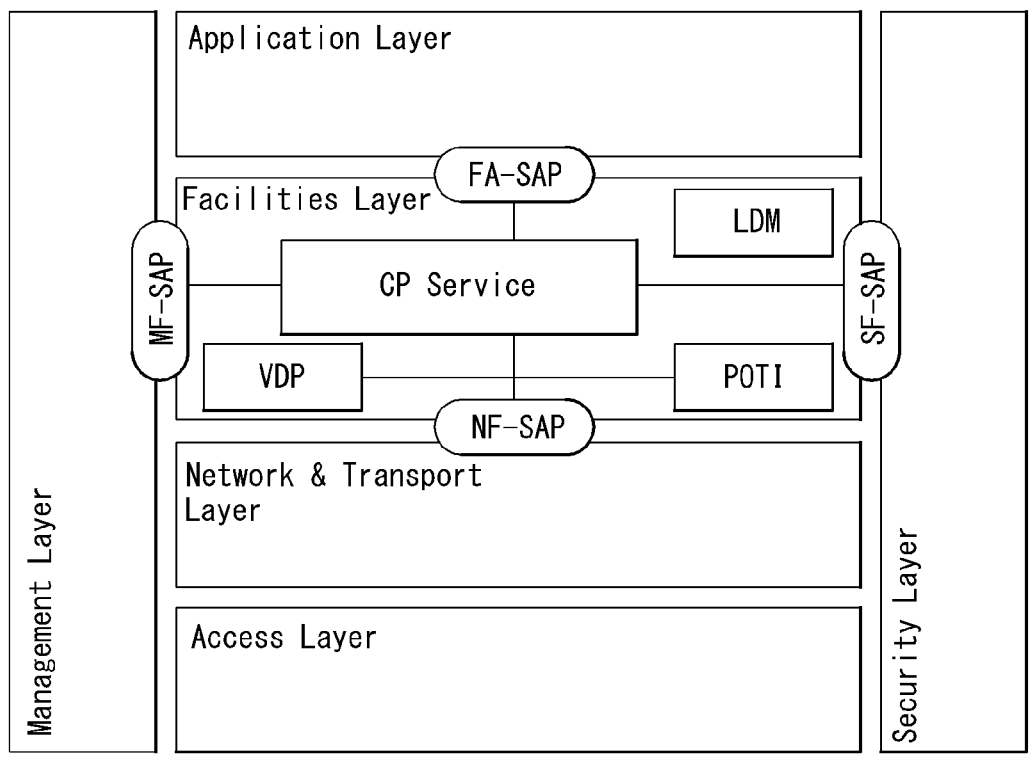
[FIG. 4]
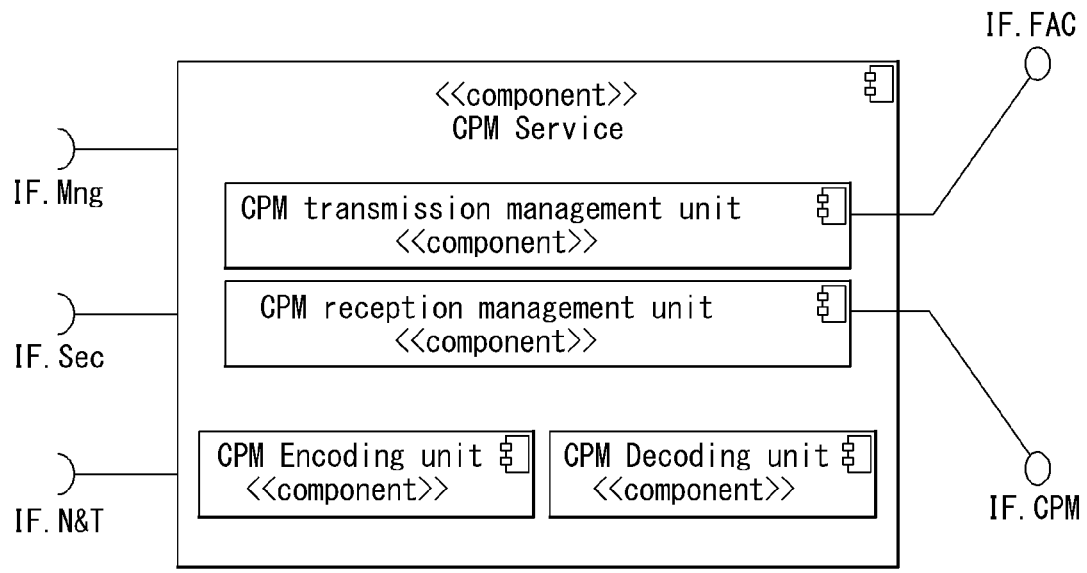

[FIG. 5]

| ITS PDU Header | Originating Vehicle Container | Field-of-View Container || Perceived Object Container ||
|---|---|---|---|---|---|
| | | Sensor1 | ... | Sensor n | Object 1 | ... | Object n |

[FIG. 6]
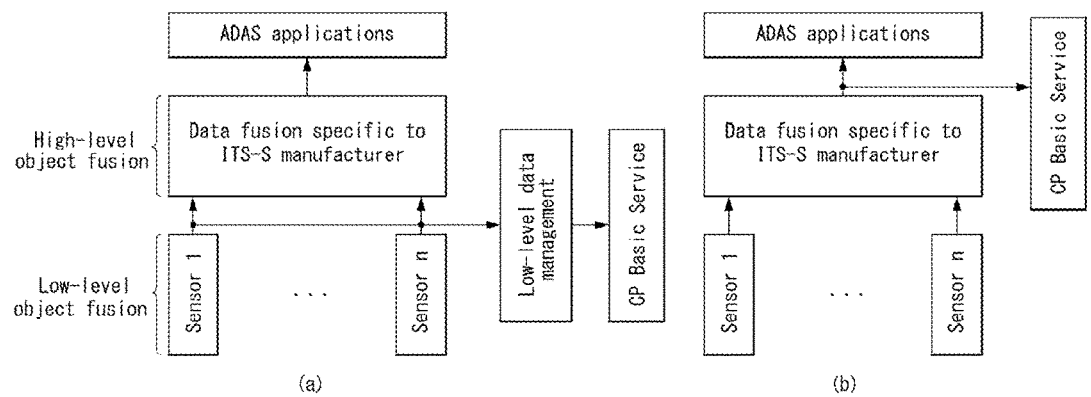

[FIG. 7]
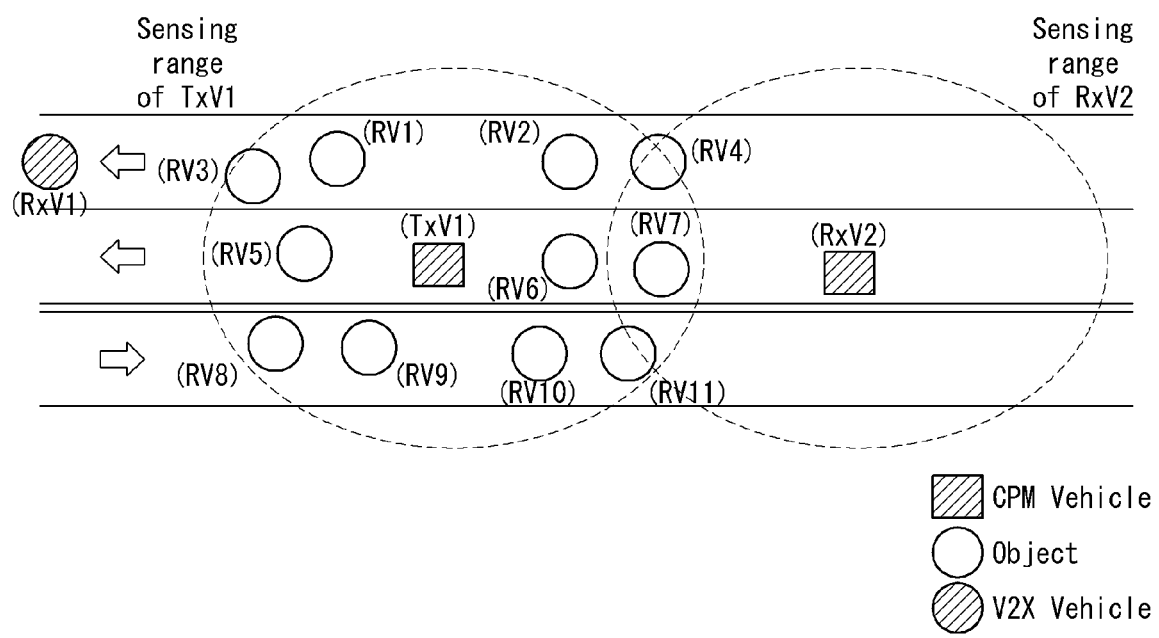

[FIG. 8]
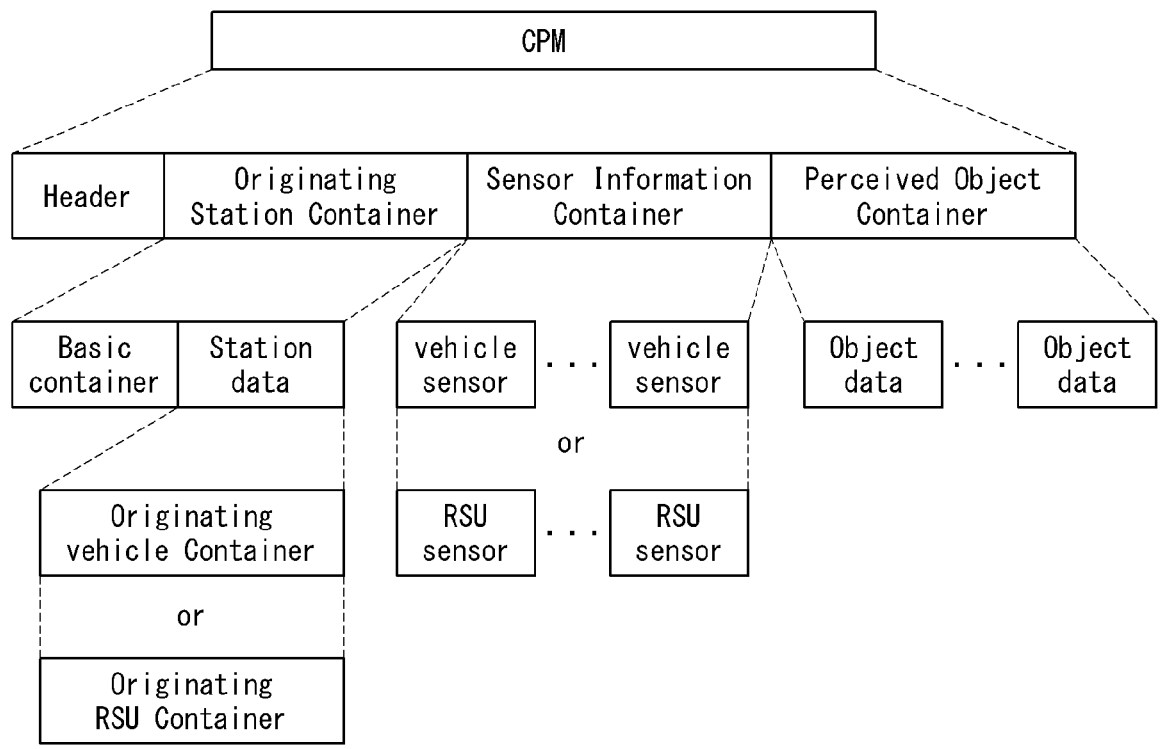
[FIG. 9]
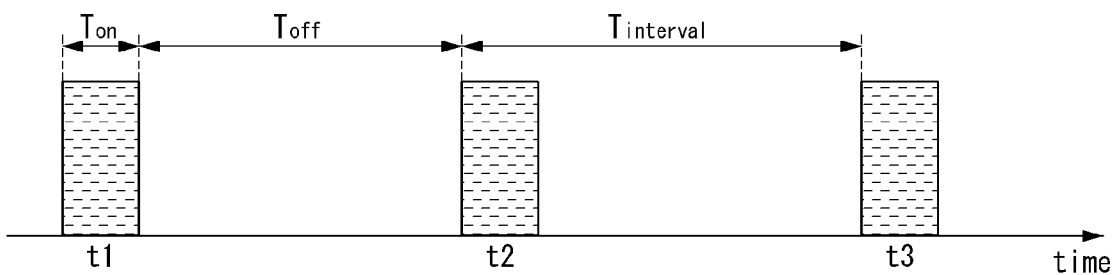

[FIG. 10]
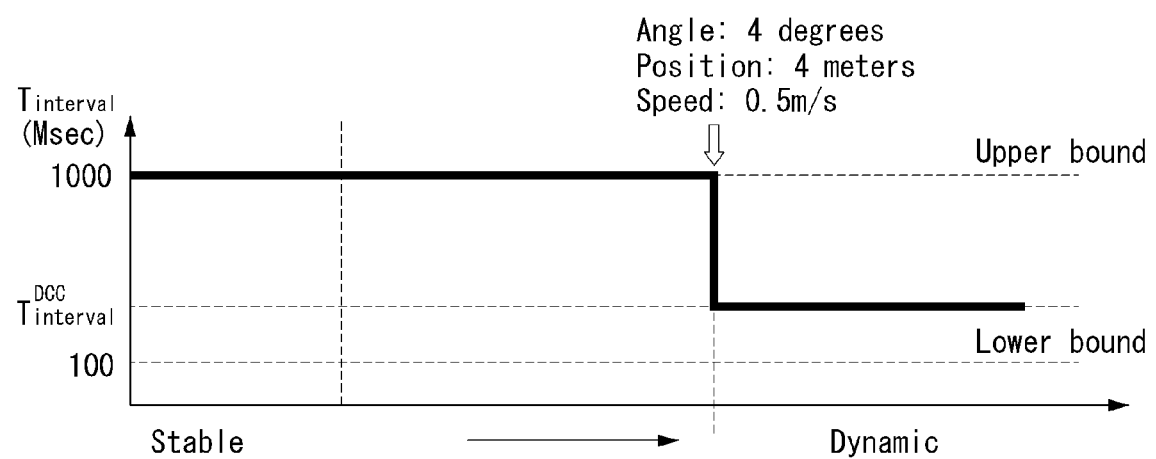

[FIG. 11]
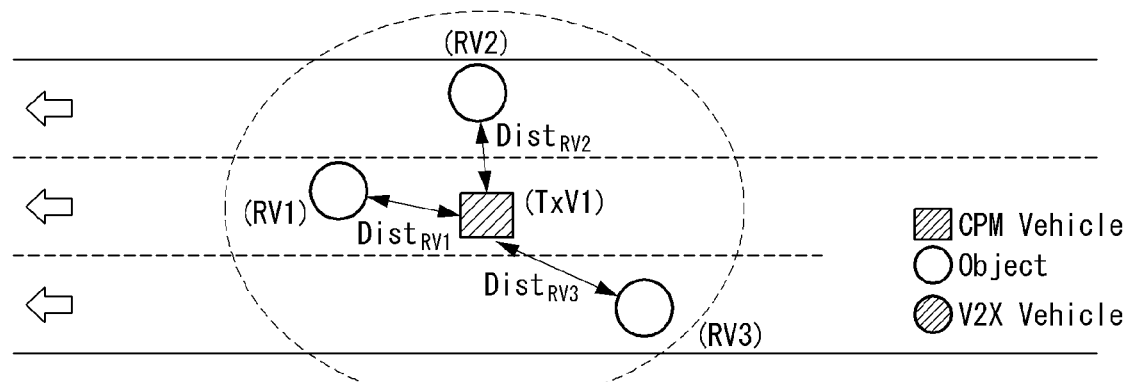
[FIG. 12]
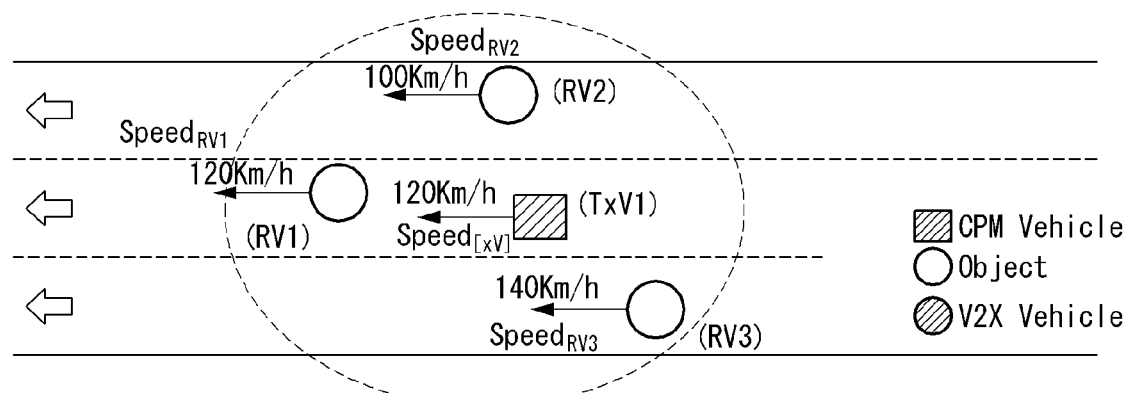

[FIG. 13]
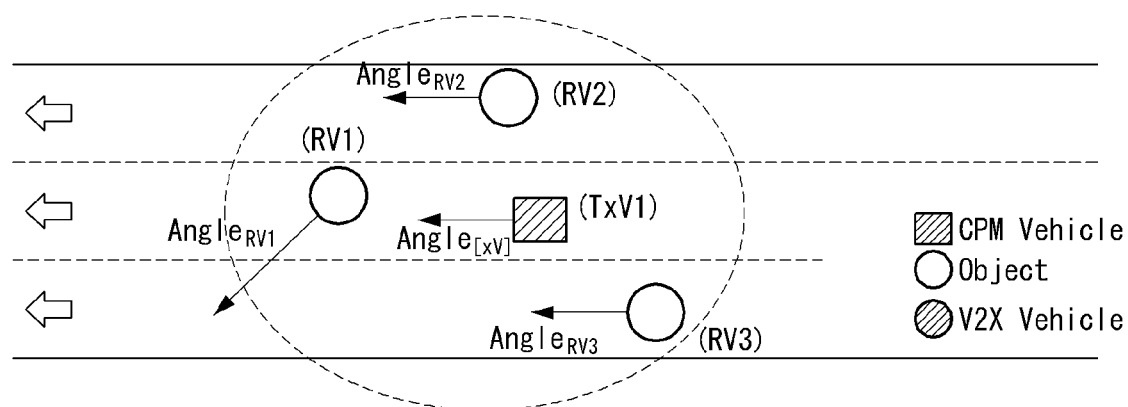
[FIG. 14]
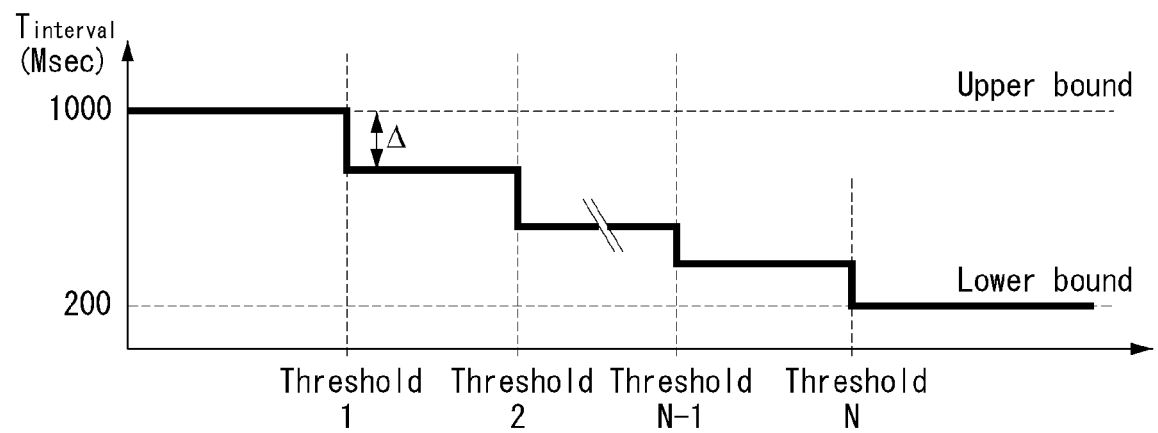

[FIG. 15]
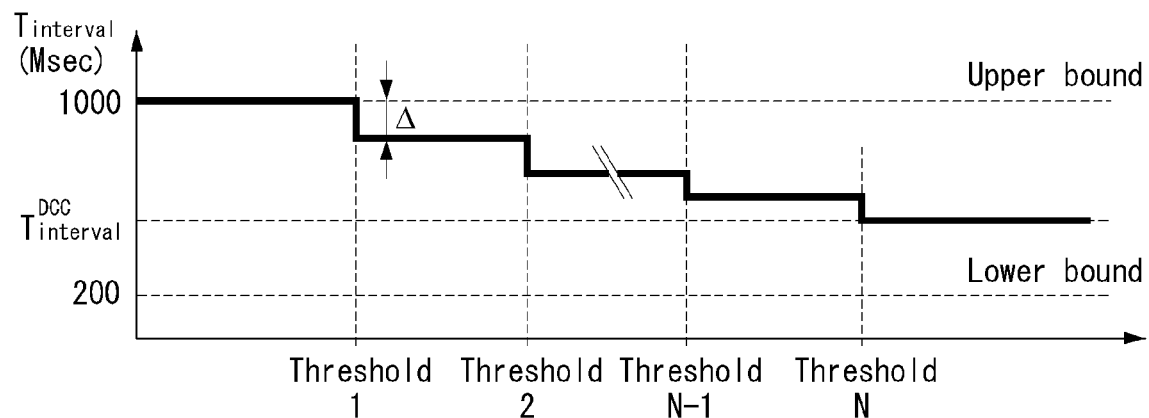
[FIG. 16]
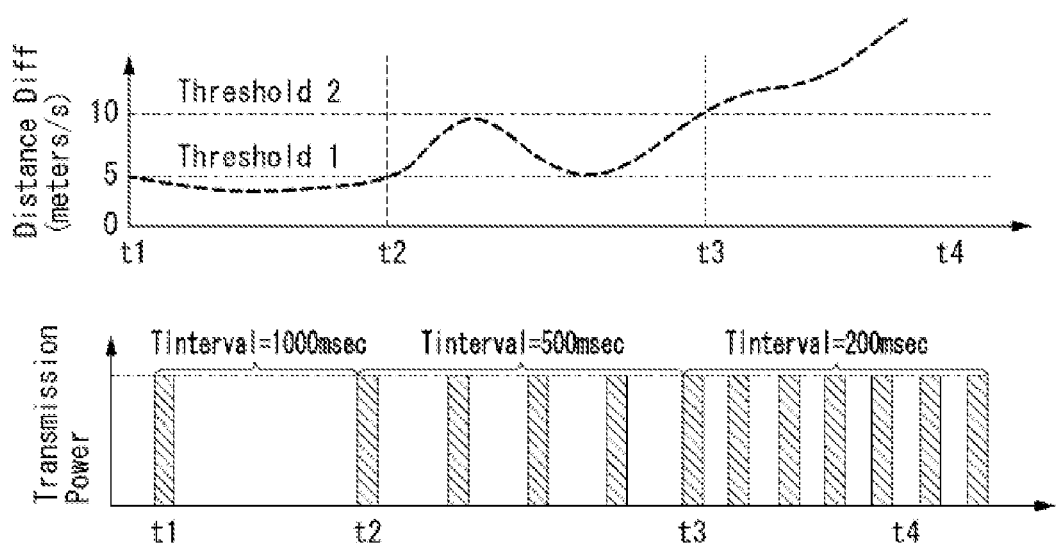

[FIG. 17]
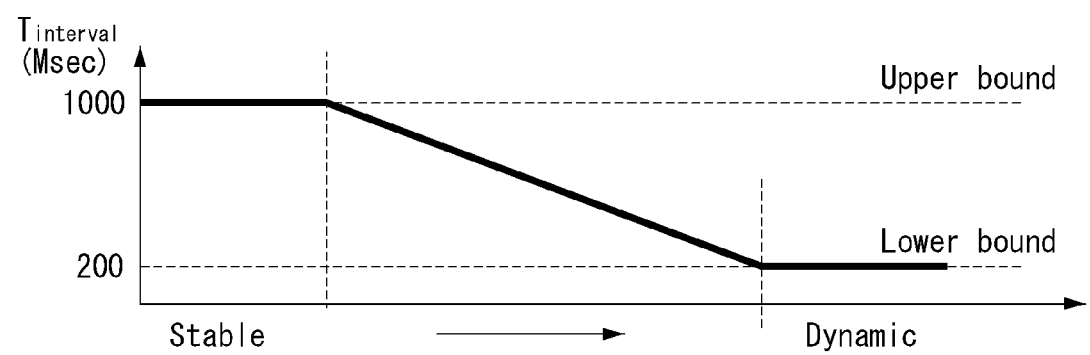
[FIG. 18]
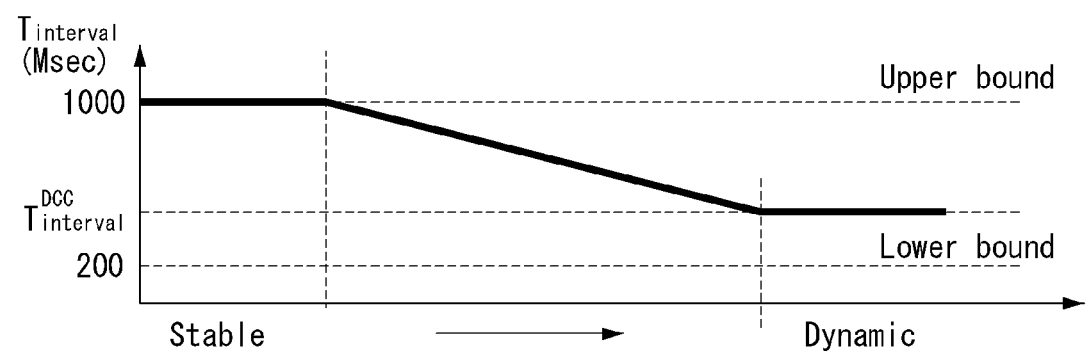

[FIG. 19]
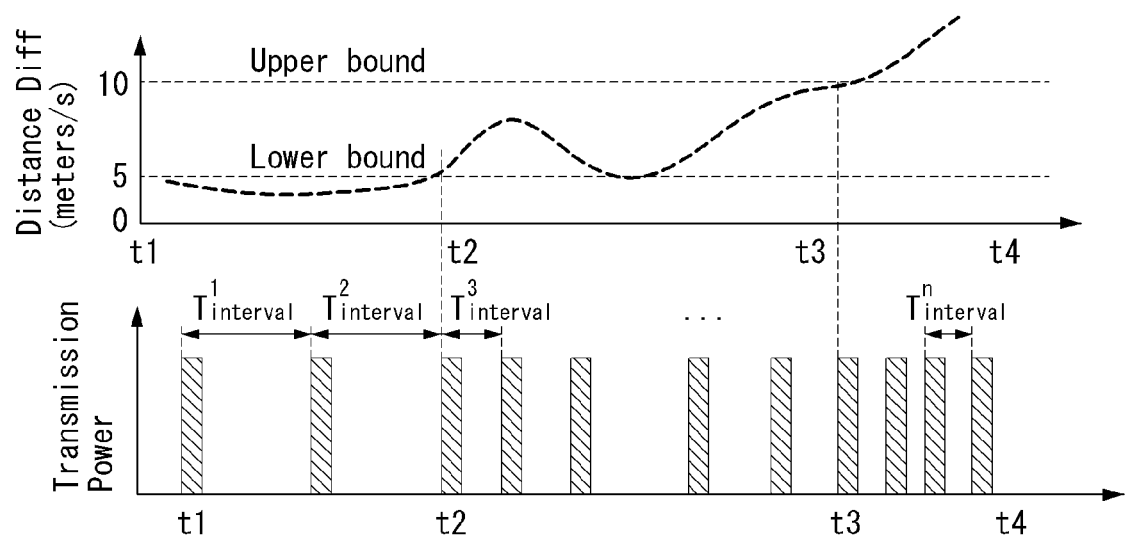

[FIG. 20]
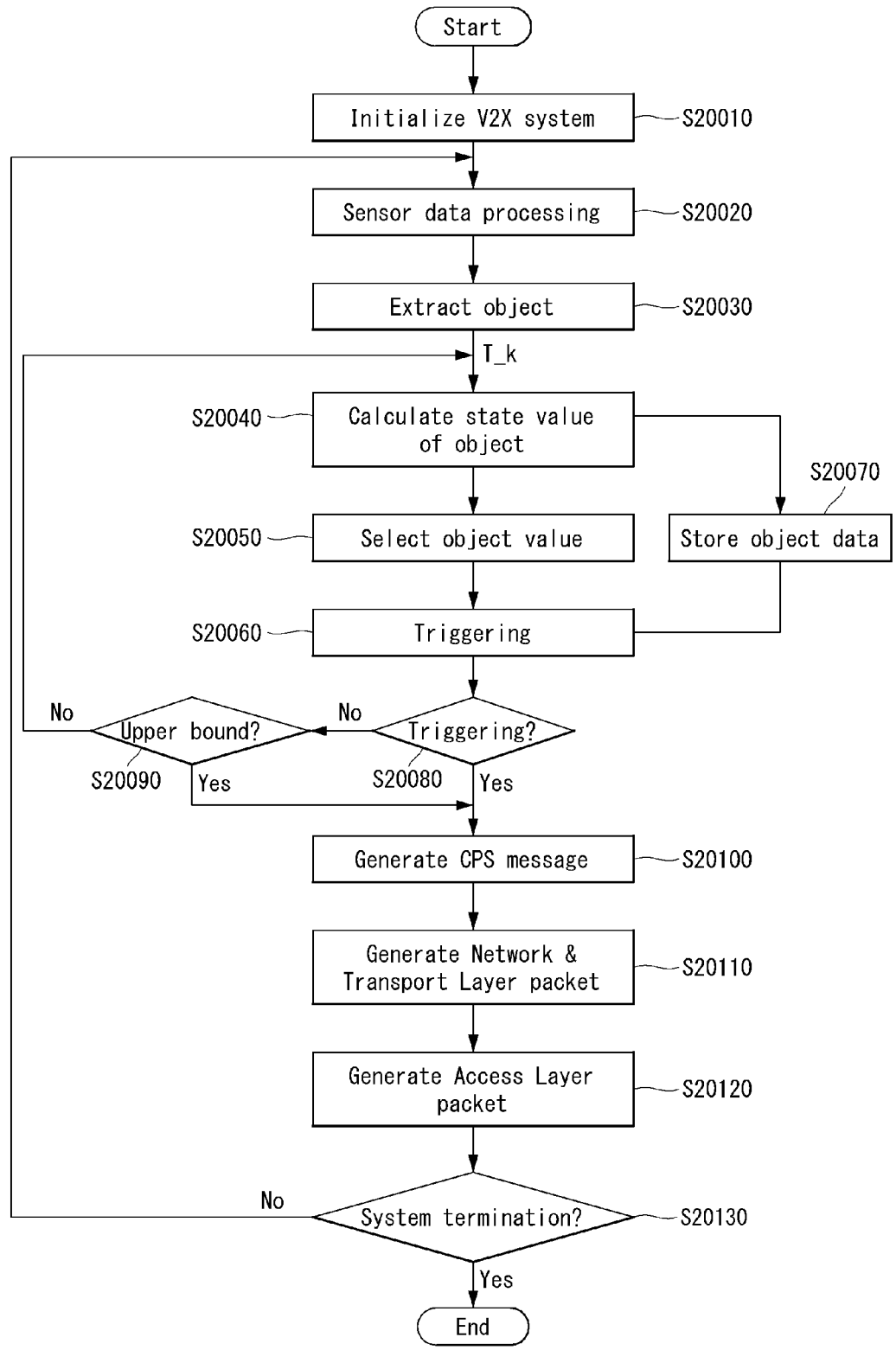

【FIG. 21】
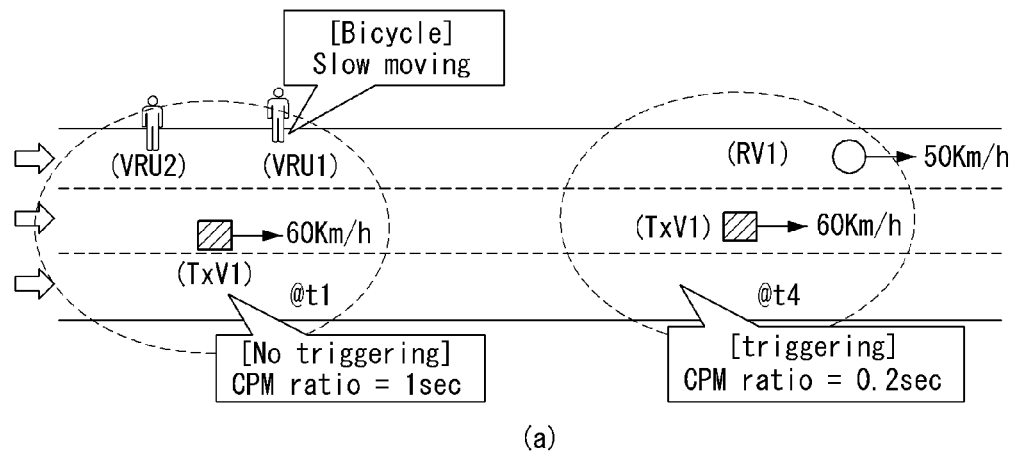
(a)
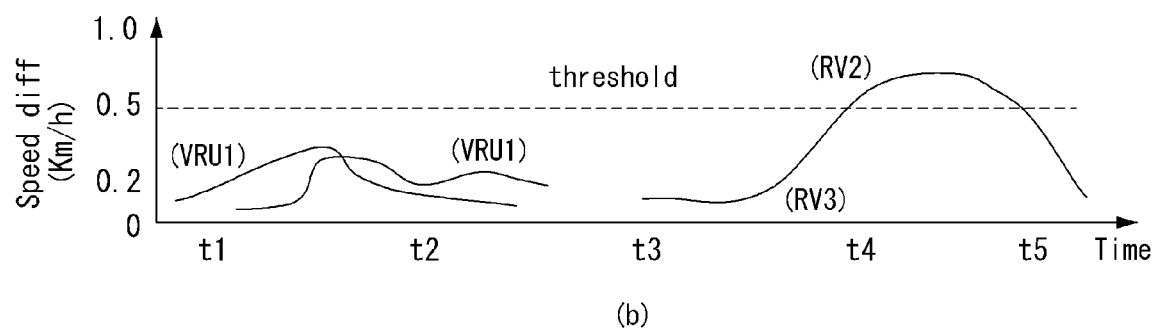
(b)
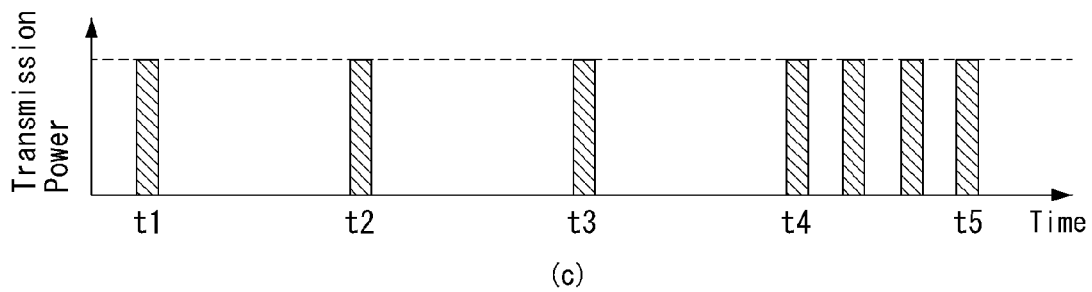
(c)

[FIG. 22]
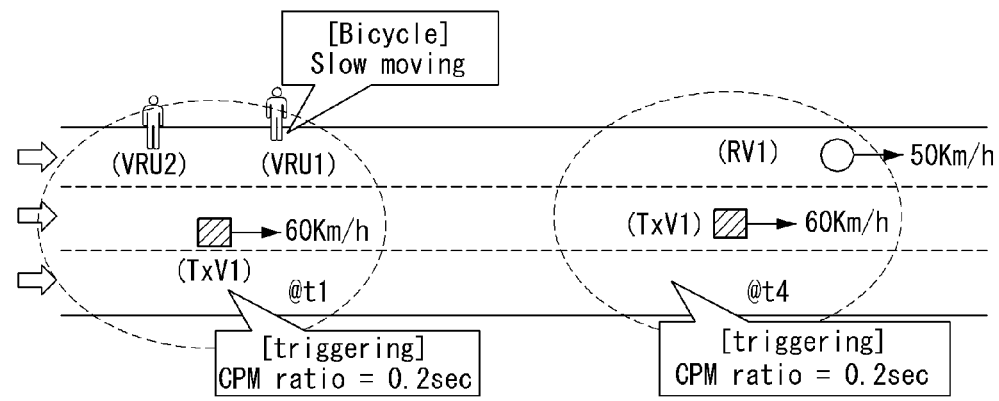
(a)
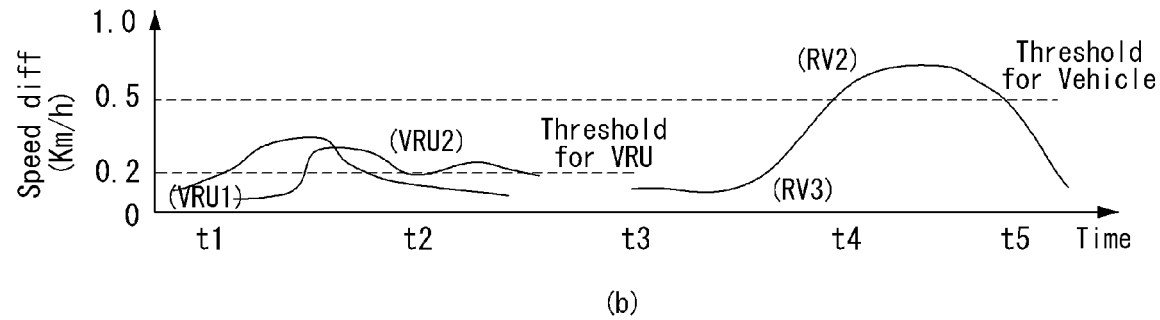
(b)
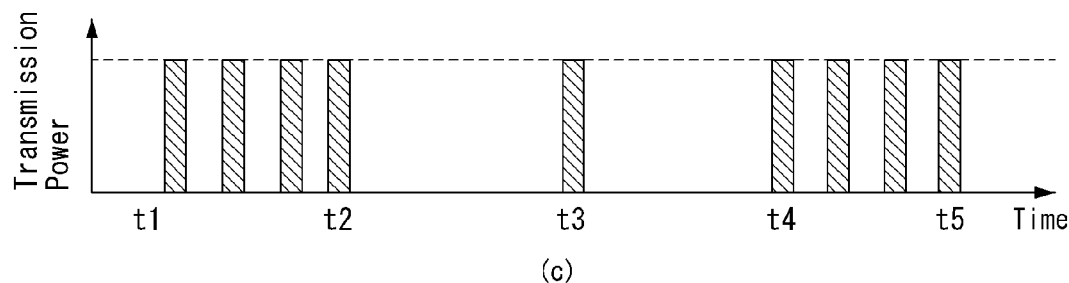
(c)

[FIG. 23]
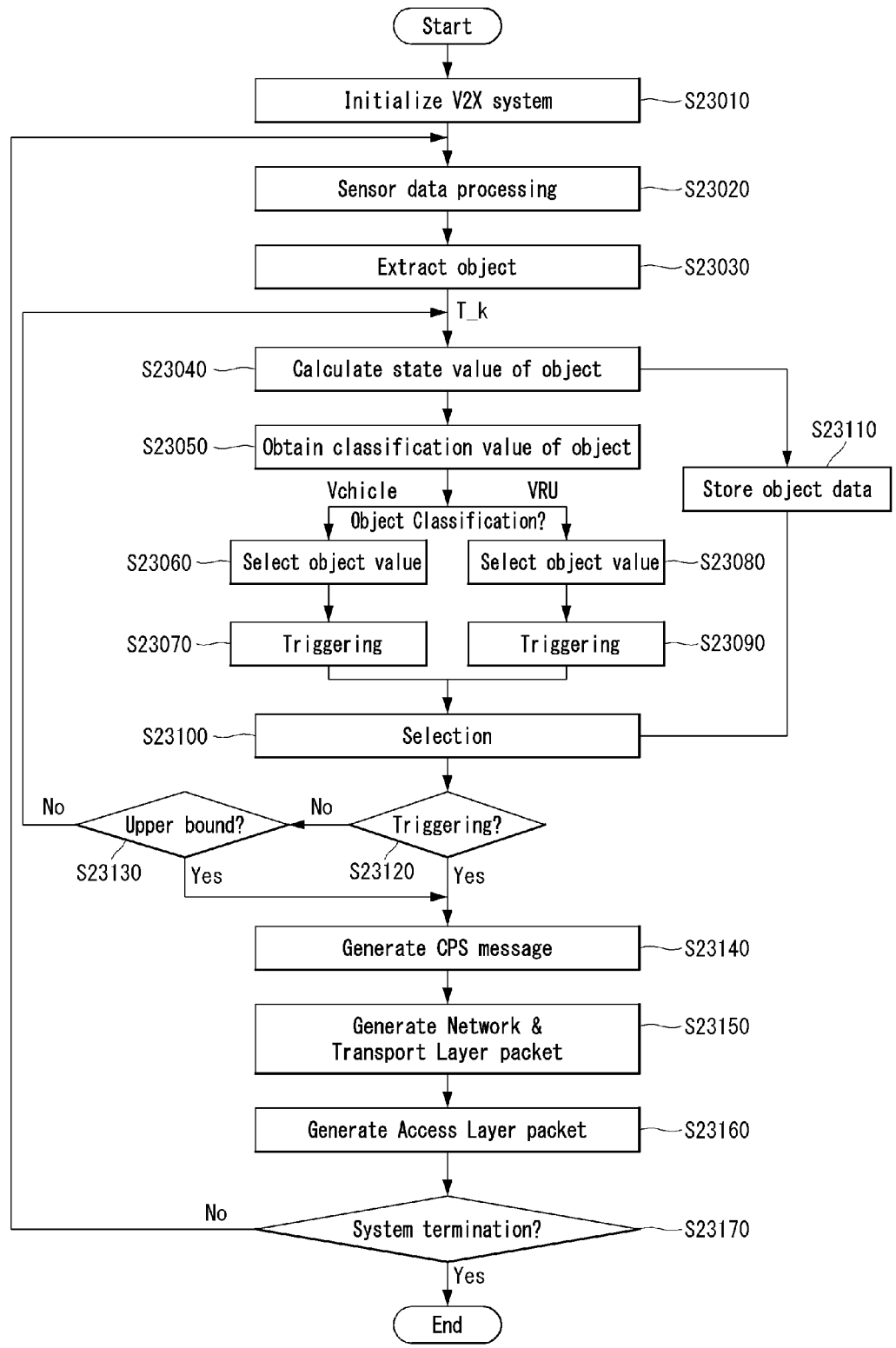

[FIG. 24]
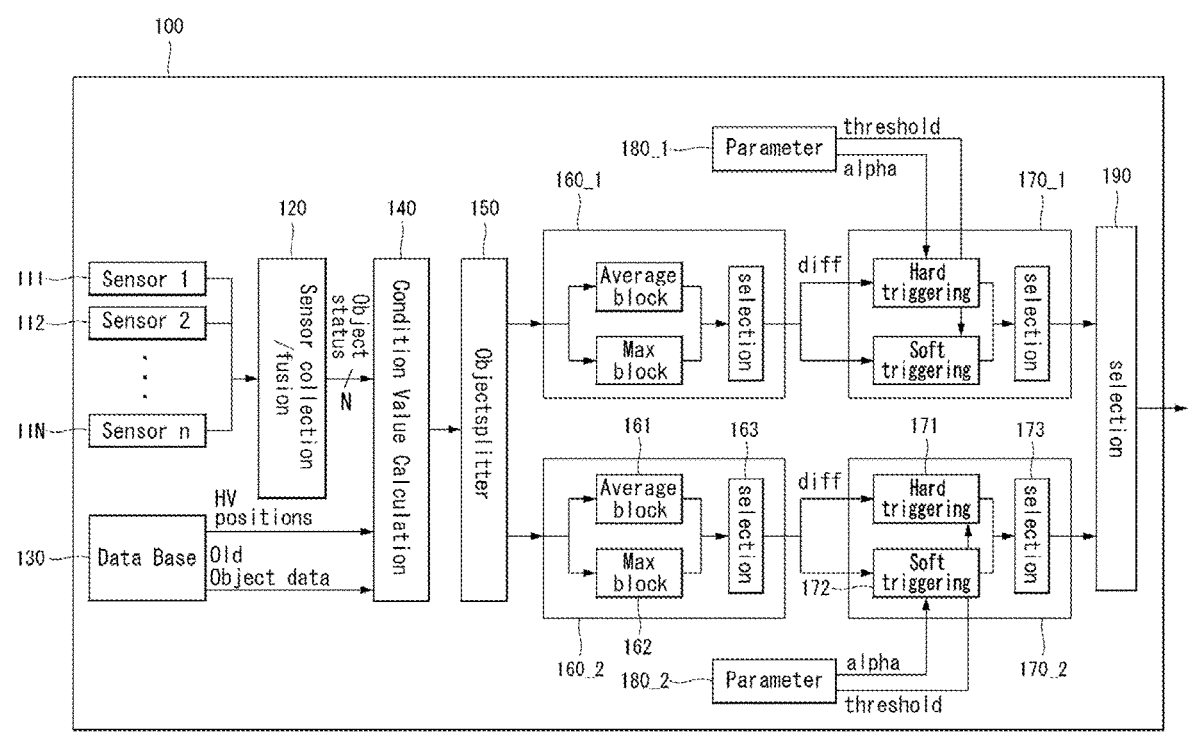

【FIG. 25】
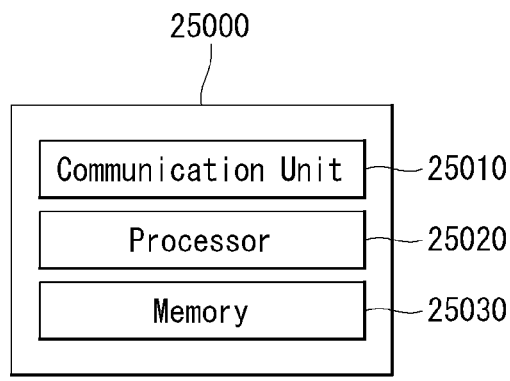
【FIG. 26】
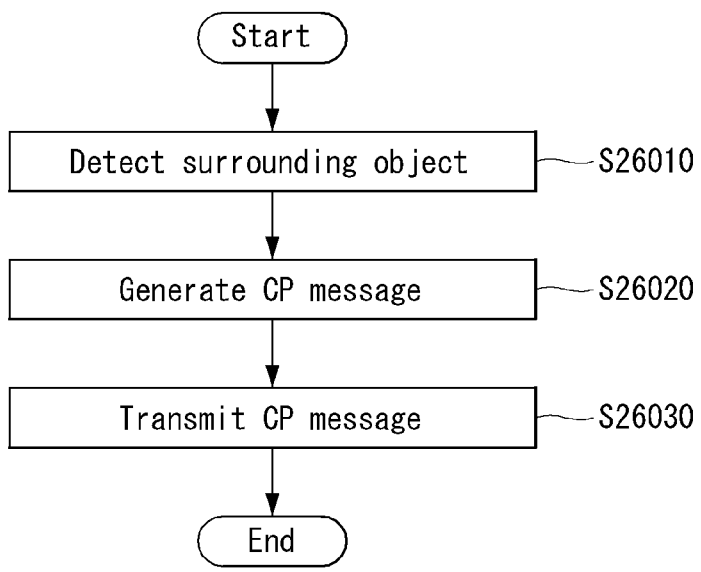

APPARATUS AND METHOD FOR V2X COMMUNICATION

This application is the National Stage filing under 35 U.S.C. 371 of International Application No. PCT/KR2018/012935 filed on Oct. 29, 2018, the contents of which is hereby incorporated by reference herein in its entirety.

TECHNICAL FIELD

The present disclosure relates to a device and method for V2X communication and, more particularly, to a method of transmitting or receiving, by a V2X communication device, a collective perception message (CPM).

BACKGROUND ART

Recently, a vehicle becomes a product of a complex industrial technology in which electrical, electronic and communication technologies have been converged out of mechanical engineering. In this respect, a vehicle is also called a smart car. The smart car provides various customized mobile services in addition to conventional vehicle technologies, such as traffic safety/congestion solution, by connecting drivers, vehicles, and transportation infrastructure. Such connectivity may be implemented using a vehicle to everything (V2X) communication technology.

DISCLOSURE

Technical Problem

Various services may be provided through V2X communication. The ITS system of a vehicle performing V2X communication may provide various services for traffic safety and efficiency. One of the services is a cooperative awareness (CA) service. Cooperative awareness within road traffic means that a road user and roadside infrastructure can be aware of mutual positions, dynamics and attributes. Such awareness is a basic for several road safety and traffic efficiency applications.

As described above, the CA service can support traffic safety in such a manner that a V2X communication device periodically provides its own position and state to surrounding V2X communication devices. However, the CA service has limits in that only information of a corresponding V2X communication device itself can be shared. In order to supplement the limits, there is a need for the development of a service using a new method.

Technical Solution

In order to solve the above-described and other technical problems, the present disclosure proposes a device and method for V2X communication.

In one aspect of the present disclosure, there is provided a method of transmitting a V2X message of a vehicle, the method comprising detecting at least one surrounding object; based on whether a state of the detected object satisfies a preset trigger condition of a collective perception (CP) message, generating the CP message including information on the detected object; and transmitting the CP message, wherein the CP message is generated when the state of the detected object satisfies the trigger condition, or is generated when the state of the detected object does not satisfy the trigger condition and a specific time has passed after the previously transmitted CP message is generated.

The trigger condition may be satisfied when a moving orientation change of the detected object exceeds a first threshold, when a position change of the detected object exceeds a second threshold, or when a speed change of the detected object exceeds a third threshold, based on a time at which the previously transmitted CP message is generated.

The trigger condition may be satisfied when a moving orientation difference between the detected object and the vehicle exceeds a fourth threshold, when a distance between the detected object and the vehicle exceeds a fifth threshold, or when a speed difference between the detected object and the vehicle exceeds a sixth threshold.

Generating the CP message may further comprise, when the detected object includes a plurality of objects, checking whether the trigger condition of the CP message is satisfied based on an object having an average value of the detected objects or a maximum value of the detected objects.

The method may further comprise determining a transmission interval of the CP message, wherein the transmission interval of the CP message may be determined based on a distance between the detected object and the vehicle and at least one of a plurality of preset thresholds.

The transmission interval of the CP message may be determined based on the trigger condition that is differently set depending on a classification of the object.

In another aspect of the present disclosure, there is provided a V2X communication device of a vehicle comprising a memory configured to store data; a communication unit configured to transmit and receive a radio signal including a collective perception (CP) message; and a processor configured to control the memory and the communication unit, wherein the processor is configured to detect at least one surrounding object; based on whether a state of the detected object satisfies a preset trigger condition of the CP message, generate the CP message including information on the detected object; and transmit the CP message, wherein the CP message is generated when the state of the detected object satisfies the trigger condition, or is generated when the state of the detected object does not satisfy the trigger condition and a specific time has passed after the previously transmitted CP message is generated.

The trigger condition may be satisfied when a moving orientation change of the detected object exceeds a first threshold, when a position change of the detected object exceeds a second threshold, or when a speed change of the detected object exceeds a third threshold, based on a time at which the previously transmitted CP message is generated.

The trigger condition may be satisfied when a moving orientation difference between the detected object and the vehicle exceeds a fourth threshold, when a distance between the detected object and the vehicle exceeds a fifth threshold, or when a speed difference between the detected object and the vehicle exceeds a sixth threshold.

The processor may be further configured to, when the detected object includes a plurality of objects, check whether the trigger condition of the CP message is satisfied based on an object having an average value of the detected objects or a maximum value of the detected objects.

The processor may be further configured to determine a transmission interval of the CP message, and the transmission interval of the CP message may be determined based on a distance between the detected object and the vehicle and at least one of a plurality of preset thresholds.

The transmission interval of the CP message may be determined based on the trigger condition that is differently set depending on a classification of the object.

Advantageous Effects

According to embodiments of the present disclosure, the present disclosure can efficiently provide CPS service by setting a trigger condition for generating (or transmitting) a CPM message based on a relative moving orientation, distance, and speed of an object.

DESCRIPTION OF DRAWINGS

The accompany drawings which are included for further understanding of the disclosure and included in this disclosure and which form part of the disclosure illustrate embodiments of the disclosure along with the detailed description that describes the principle of the disclosure.

FIG. 1 illustrates exemplary architecture of a V2X communication device according to an embodiment of the present disclosure.

FIG. 2 illustrates a method of processing a V2X message according to an embodiment of the present disclosure.

FIG. 3 illustrates architecture of the V2X communication device providing CP services according to an embodiment of the present disclosure.

FIG. 4 illustrates a function block diagram CP services according to an embodiment of the present disclosure.

FIG. 5 illustrates a CPM structure according to an embodiment of the present disclosure.

FIG. 6 illustrates a method of extracting sensor data by a V2X communication device providing a CP service according to an embodiment of the present disclosure.

FIG. 7 illustrates CP service, as an embodiment to which the present disclosure is applicable.

FIG. 8 illustrates a structure of a CPM message according to an embodiment to which the present disclosure is applicable.

FIG. 9 illustrates a method of managing a CPM message according to an embodiment of the present disclosure.

FIG. 10 illustrates a method of managing a CAM message according to an embodiment of the present disclosure.

FIG. 11 illustrates a method of managing a CPM message according to an embodiment of the present disclosure.

FIG. 12 illustrates a method of managing a CPM message according to an embodiment of the present disclosure.

FIG. 13 illustrates a method of managing a CPM message according to an embodiment of the present disclosure.

FIG. 14 illustrates a method of adjusting a transmission period of a CPM message according to an embodiment of the present disclosure.

FIG. 15 illustrates a method of adjusting a transmission period of a CPM message according to an embodiment of the present disclosure.

FIG. 16 illustrates a method of adjusting a transmission period of a CPM message according to an embodiment of the present disclosure.

FIG. 17 illustrates a method of adjusting a transmission period of a CPM message according to an embodiment of the present disclosure.

FIG. 18 illustrates a method of adjusting a transmission period of a CPM message according to an embodiment of the present disclosure.

FIG. 19 illustrates a method of adjusting a transmission period of a CPM message according to an embodiment of the present disclosure.

FIG. 20 is a flow chart illustrating a method of generating a CPM message according to an embodiment of the present disclosure.

FIG. 21 illustrates an example of a triggering method according to types of objects, as an embodiment to which the present disclosure is applicable.

FIG. 22 illustrates an example of a multi-triggering method according to types of objects, as an embodiment to which the present disclosure is applicable.

FIG. 23 is a flow chart illustrating a method of generating a CPM message according to an embodiment of the present disclosure.

FIG. 24 illustrates an example of a block diagram of a V2X communication device according to an embodiment of the present disclosure.

FIG. 25 illustrates configuration of a V2X communication device according to an embodiment of the present disclosure.

FIG. 26 is a flow chart illustrating a method for a V2X communication device to send an ITS message in accordance with an embodiment of the present disclosure.

BEST MODE

Preferred embodiments of the disclosure will be described in detail with reference to the accompanying drawings. The following detailed description with reference to the accompanying drawings is to illustrate preferred embodiments of the disclosure rather than illustrate only embodiments that can be implemented according to embodiments of the disclosure. The following detailed description includes details in order to provide the full understanding of the present disclosure, but the present disclosure does not require all of these details. The embodiments described below need not be separately used. A plurality of embodiments or all embodiments may be together used, and specific embodiments may be used in combination with each other.

Most of the terms used in this disclosure are selected from common ones widely used in the corresponding field, but some terms are arbitrarily selected by the applicant and the meaning thereof will be described in detail in the following description as necessary. Therefore, the present disclosure should be understood based on the intended meanings of the terms rather than the simple names or meanings of the terms.

The present disclosure relates to a V2X communication device. The V2X communication device is included in an intelligent transport system (ITS), and may perform some of or all the functions of the ITS system. The V2X communication device may perform communication between a vehicle and a vehicle, a vehicle and infrastructure, a vehicle and a bicycle, or with a mobile device. In one embodiment the V2X communication device may correspond to the on board unit (OBU) of a vehicle or may be included in an OBU. The OBU may be referred to as an on board equipment (OBE). The V2X communication device may correspond to a road side unit (RSU) of infrastructure or may be included in an RSU. The RSU may be referred to as roadside equipment (RSE). Alternatively, the V2X communication device may correspond to an ITS station or may be included in an ITS station. All of given OBU, RSU and mobile equipment that perform V2X communication may be referred to as ITS stations. Alternatively, the V2X communication device may correspond to a wireless access in vehicular (WAVE) apparatus or may be included in a WAVE apparatus. The V2X communication device may be abbreviated as a V2X apparatus.

Hereinafter, first, a collective perception (CP) service provided by the V2X communication device and a basic structure of a CP message (CPM) for the CP service are described. Furthermore, various embodiments of the CPM structure for performance improvements of the CP service are described. Meanwhile, in the present disclosure, various embodiments are described, assuming that the V2X communication device generating a CPM is called a V2X communication device of a vehicle. However, the embodiments may be applied to the V2X communication device of an RSU or a personal V2X communication device to be described later in the same or similar manner according to circumstances. In the present disclosure, a CPM may also be referred to as a CPM message.

FIG. 1 illustrates an exemplary architecture of a V2X communication device according to an embodiment of the present disclosure. FIG. 1 may be an exemplary architecture of a V2X communication device that may be implemented based on, for example, the reference architecture of an ITS station compliant with the EU standard.

Application layer: The application layer may implement and support various use cases. For example, an application may provide road safety, efficient traffic information, and other application information.

Facilities layer: The facilities layer may support effective implementation of various usage examples defined in the application layer.

This facilities layer may basically support the same or similar functions as the upper three layers of an OSI model. In addition, facilities for the V2X communication device may be provided. For example, the facilities layer may provide facilities such as application support, information support, and session/communication support. Here, the facilities refer to a component that provides functionality, information, and data. The three facilities proposed as an example will be described as follows.

The application support facility refers to a facility that supports a basic application set (or message set). In the case of the V2X communication device of FIG. 1, the facilities layer may support V2X messages/ITS messages, for example, a periodic message such as CAM or an event message such as Decentralized Environmental Notification Messages (DENM). The facilities layer may also support, for example, CPM messages.

The information support facility may be a facility that provides common data information or database used for a basic application set (or message set), and may be, for example, a Local Dynamic Map (LDM).

The session/communication support facility is a facility that provides services for communication and session management, and may be an addressing mode, a session support and the like.

As described above, the facilities layer supports the application set (or message set) as one of main functions thereof. That is, the facilities layer performs a role of generating a message set (or message) based on information to be transmitted or a service to be provided by the application layer. The generated message may be referred to as a V2X message/ITS message, which will be described in detail below with reference to the accompanying drawings.

Access layer: The access layer may transmit the message/data received at the upper layers through a physical channel. For example, the access layer may perform/support data communication, based on an IEEE 802.11 and/or 802.11p standards-based communication technology, an ITS-G5 wireless communication technology based on a physical transmission technology of the IEEE 802.11 and/or 802.11p standards, a 2G/3G/4G (LTE)/5G wireless cellular communication technology including satellite/broadband wireless mobile communication, a broadband terrestrial digital broadcasting technology such as DVB-T/T2/ATSC, a GPS technology, and an IEEE 1609 WAVE technology.

Network and Transport Layer: The network/transport layer may configure a network for vehicle communication between homogenous/heterogeneous networks, by using various transport protocols and network protocols.

The transport layer is a connection layer between services provided by the upper layers (session layer, presentation layer, and application layer) and the lower layers (network layer, data link layer, and physical layer). The transport layer may manage the transmitted data to exactly arrive at a destination. At the transmitting side, the transport layer may process the data into packets of an appropriate size for efficient data transmission, and at the receiving side, the transport layer may perform processing to recover the received packets to the original file. In an embodiment, protocols such as Transmission Control Protocol (TCP), User Datagram Protocol (UDP), and Basic Transport Protocol (BTP) may be used as a transport protocol.

The network layer may manage the logical address, and may determine the delivery path of the packet. The network layer may receive the packet generated in the transport layer, and may add the logical address of the destination to a network layer header. In an embodiment, the packet path may be considered for unicast/broadcast between vehicles, between vehicles and fixed stations, and between fixed stations. In an embodiment, geo-networking, IPv6 networking with mobility support, and IPv6 over geo-networking may be considered as the networking protocol.

The exemplary architecture of V2X communication device may further include a management layer and a security layer.

FIG. 2 illustrates a method of processing a V2X message according to an embodiment of the present disclosure.

As described above, the application layer or the facilities layer may generate a V2X message. For example, a CAM, a DENM, or a CPM message may be generated as the V2X message.

The transport layer may generate a BTP packet, and the network layer may encapsulate the BTP packet to generate a GeoNetworking packet. The GeoNetworking packet may be encapsulated into an LLC packet. In the embodiment of FIG. 2, the data may include a message set, and the message set may become a basic safety message.

BTP is a protocol for transmitting the V2X message generated in a facilities layer to a lower layer. A BTP header includes A type and B type. The A type BTP header may include a destination/destination port and a source port, which are necessary for transmission/reception in interactive packet transmission. The B type header may include destination port and destination port information necessary for transmission in non-interactive packet transmission. A description of fields/information included in the header is as follows.

Destination Port: The destination port identifies a facility entity corresponding to the destination of the data (BTP-PDU) included in the BTP packet.

Source Port: As a field generated in the case of the BTP-A type, the sound port indicates the port of the protocol entity of the facilities layer at a source to which the corresponding packet is transmitted. This field may have a size of 16 bits.

Destination Port Info: As a field generated in the case of the BTP-B type. The destination port info may provide additional information when the destination port is the most well-known port. This field may have a size of 16 bits.

The GeoNetworking packet includes a basic header and a common header according to the protocol of the network layer, and selectively includes an extension header according to the geo networking mode. The GeoNetworking header will be again described below.

An LLC header is added to the GeoNetworking packet to generate an LLC packet. The LLC header provides a function of distinguishing and transmitting IP data and GeoNetworking data. The IP data and the GeoNetworking data may be distinguished by Ethertype of SNAP. In an embodiment, when IP data is transmitted, the Ether type may be set to 0x86DD and included in the LLC header. In an embodiment, when GeoNetworking data is transmitted, the Ether type may be set to 0x86DC and included in the LLC header. A receiver may check the Ethertype field of the LLC packet header, and may forward and process the packet to the IP data path or the GeoNetworking path according to the value of the Ethertype field of the LLC packet header.

FIG. 3 illustrates an exemplary architecture of a V2X communication device providing a CP service according to an embodiment of the present disclosure.

The V2X communication device may provide various services for traffic safety and efficiency. One of the services may be a Cooperative Awareness (CA) service. The Cooperative Awareness in road traffic means that road users and roadside infrastructures can know mutual positions, dynamics and attributes. Here, the road users may be all kinds of users on a road or near a road, which act as traffic safety and control, such as a vehicle, a truck, a motorcycle, a bicycle or a pedestrian, and the roadside infrastructures may be equipment including a road sign, a traffic light or a barrier and an entrance.

This awareness of each other becomes basics of many road safety and traffic efficiency applications. This can be performed by regular exchange of information between road users at vehicle to vehicle (V2V), vehicle to infrastructure (V2I), infrastructure to vehicle (I2V) or everything to everything (X2X) which are based on a wireless network called a V2X network.

On this other hand, the cooperative safety and traffic efficiency applications require the V2X communication device to develop situational awareness that includes the presence and behavior of road users around the V2X communication device. For example, the V2X communication device may develop situational awareness through communication with its own sensors and other V2X communication devices. In this case, the CA service may specify how the V2X communication device can inform its own position, dynamics and attributes by sending a Cooperative Awareness Message (CAM).

Thus, in regard to the CA service, the V2X communication device may periodically provide its own position and state to surrounding V2X communication devices, thereby supporting traffic safety. However, the CA service has a limitation in that only information of the corresponding V2X communication device itself can be shared. In order to overcome this limitation, it is necessary to develop services such as a collective perception (CP) service.

The CP service may specify how the V2X communication device can inform other V2X communication devices about the position, dynamics, and attributes of surrounding road users and other objects that are detected. For example, the CP service may share this information with other V2X communication devices through the transmission of Collective Perception Messages (CPM). This CP service may be an optional facility for all types of V2X communication devices (vehicle V2X communication device, road side V2X communication device, personal V2X communication device, etc.) participating in road traffic.

Hereinafter, a CPM transmitted by a V2X communication device participating in a V2X network and a CP service for transmitting the CPM will be described in detail with reference to FIG. 3. In this disclosure, the CPM may be a message exchanged between V2X communication devices via a V2X network, and may be used to generate collective perception for road users and other objects detected and/or recognized by the V2X communication device. In this case, the detected road user or object may be, but not limited to, a road user or an object which is not equipped with a V2X communication device.

As described above, the V2X communication device sharing information through the CAM shares only information about the state recognition of the V2X communication device itself with other V2X communication devices in order to generate cooperative awareness. In this case, since the road user or other objects unequipped with the V2X communication device are not a part of the system, a view about safety and traffic management related situations may be limited.

One method for improving this is that a system/device equipped with the V2X communication device and capable of recognizing road users and objects unequipped with the V2X communication device informs other V2X communication devices of the presence and state of these road users and objects unequipped with V2X device (or ITS-S). In order to easily improve the safety and traffic management performance, the CP service may recognize the cooperative awareness of the presence of the road user and the object unequipped with V2X device, and thereby may improve the safety and traffic management performance of the system equipped with the V2X communication device.

As shown in FIG. 3, the CP service may be a facilities layer entity that operates a CPM protocol. For example, the CP service may be a part of the application support domain of the facilities layer. FIG. 3 illustrates a logical interface for the CP service and other layers in the exemplary architecture of V2X communication device and a potential logical interface for entities in a facilities layer.

This CP service may provide two services, for example, sending and receiving of CPM. On the other hand, the CP service may be fundamentally different from the CA service in that the CP service cannot receive input data on a host V2X communication device, for example, from a VDP or POTI unit.

The sending of the CPM includes generation and transmission of the CPM. In the generation process of the CPM, the originating V2X communication device configures a CPM, and then the CPM is delivered to the networking and transport layer for dissemination. In this disclosure, the originating V2X communication device may be referred to as a sending V2X communication device, a transmitting V2X communication device, a host V2X communication device, and the like.

On the other hand, in order to collect relevant information for CPM generation and to deliver the received CPM content for additional processing, the CP service may interface with other entities in the facilities layer and V2X applications in the facilities layer. In an embodiment, at the V2X communication device, the entity for data collection may be a facility that provides object detection at a host object detector.

Also, in order to disseminate (or send) the CPM, the CP service may use services provided by protocol entities of the transport layer and the networking. For example, the CP service may interface with the network and the transport layer (N&T) through NF-SAP to exchange CPM messages with other V2X communication devices. Also, the CP service may interface with the secure entities through SF-SAP to access the security service for CPM dissemination and CPM reception, may interface with the management entities through MF-SAP, and may interface with the application layer through FA-SAP if the received CPM data are directly provided to the application.

The dissemination of the CPM may vary according to the applied communication system. For example, in the ITS-G5 network (defined in ETSI EN 302663), the CPM may be transmitted to all V2X communication devices within the direct communication range by the originating V2X communication device. The communication range may be particularly affected by the originating V2X communication device by changing the transmission power according to a relevant region.

Also, the CPM may be periodically generated at a rate controlled by the CP service in the originating V2X communication device. The generation frequency may be determined in consideration of a radio channel load determined by the Decentralized Congestion Control (DCC), and may be determined in consideration of the state of the detected non-ITS object, for example, dynamic behavior of position, velocity or direction, and transmission of the CPM for the same (perceived) object by other V2X communication devices.

Also, when the receiving V2X communication device receives the CPM, the CP service enables the contents of the CP to be used in facilities inside the receiving V2X communication device, such as an ITS application and/or a Local Dynamic Map (LDM). For example, the Local Dynamic Map (LDM) may be updated with the received CPM data. The V2X application may retrieve this information from the LDM for additional processing.

FIG. 4 illustrates a function blocks of a CP service according to an embodiment of the present disclosure. Specifically, FIG. 4 illustrates functional blocks of the CP service according to an embodiment and functional blocks having interfaces for other facilities and layers.

As shown in FIG. 4, the CP service may provide the following sub-functions for CPM transmission and reception.

CPM encoding: This sub-function may configure or generate a CPM according to a predefined format. In this case, the latest in-vehicle data may be included in the CPM.

CPM decoding: This sub-function may decode the received CPM.

CPM transmission management: This sub-function may implement the protocol operation of the originating V2X communication device. In particular, this may include activation and termination of the CPM transmission operation, determination of the CPM generation frequency, and trigger of the CPM generation.

CP reception management: This sub-function may implement the protocol operation of the receiving V2X communication device. In particular, this may include trigger of "CPM decoding" function in the CPM reception, provision of the received CPM data to the LDM or the V2X application of the receiving V2X communication device, and checking of the information of the optionally received CPM.

Hereinafter, the CPM dissemination will be described in detail. Specifically, the requirements for CPM dissemination, CP service activation and termination, CPM trigger conditions, CPM generation cycle, and constraints are described.

In an embodiment, point-to-multipoint communication may be used for CPM transmission. For example, when ITS-G5 is used for CPM dissemination, a control channel (G5-CCH) may be used. In an embodiment, the CPM generation may be triggered and managed by the CP service while the CP service is being activated. For example, the CP service may be activated together with V2X communication device activation, and may be terminated when the V2X communication device is terminated.

In an embodiment, the host V2X communication device may send a CPM whenever at least one object having a sufficient level of confidence that needs to be exchanged with the surrounding V2X communication device is detected. In regard to the inclusion of the detected object, the CP service needs to consider a trade-off between the object age and the channel utilization. For example, in terms of an application using information received by the CPM, updated information needs to be provided as frequently as possible. However, in terms of the ITS-G5 stack, the channel utilization needs to be minimized, and thus a low transmission period is required. Accordingly, in consideration of this, the V2X communication device needs to appropriately include the detected object or object information in the CPM. On the other hand, in order to reduce the resulting message size, the object needs to be evaluated before transmission thereof.

FIG. 5 illustrates a CPM structure according to an embodiment of the present disclosure. In the embodiment of FIG. 5, the CPM structure may be a basic CPM structure. The CPM structure of FIG. 5 may be referred to as a first CPM structure or a first type CPM structure. The CPM having the CPM structure of FIG. 5 may be referred to as a basic CPM or a first type CPM.

As described above, the CPM may be a message exchanged between V2X communication devices in a V2X network, and may be used to generate collective perception for road users and/or other objects detected and/or recognized by the V2X communication device. That is, the CPM may be a V2X message for generating a collective perception for an object detected by the V2X communication device.

In an embodiment, the CPM may include state and attribute information of road users and objects detected by the originating V2X communication device. The content may vary according to the types of detected road users or objects and the detection performance of the originating V2X communication device. For example, in the case of a vehicle object, the state information may include at least information on the actual time, position, and motion state. Also, the attribute information may include attributes such as dimension, vehicle type, and role within road traffic.

This CPM may complement the CAM, and may act similarly to the CAM. That is, the CPM may be for increasing the cooperative awareness. The CPM may include externally observable information about the detected road user or object. On the other hand, the CP service may include a method of reducing replication or duplication of the CPMs sent by different V2X communication devices by checking the CPMs sent by the other stations.

Upon CPM reception, the receiving V2X communication device may recognize the presence, type and state of the road user or object detected by the originating V2X communication device. The received information may be used by the receiving V2X communication device to support ITS applications for increasing safety and improving traffic efficiency and travel time. For example, by comparing the received information with the state of the detected road user or object, the receiving V2X communication device may estimate the risk of collision with the road user or object. Also, the receiving V2X communication device may inform a user through a Human-Machine Interface (HMI) of the receiving V2X communication device, or may automatically take corrective actions.

Hereinafter, the basic structure/format of the CPM will be described with reference to FIG. 5. This CPM format may be presented or encoding/decoding as ASN.1. Also, Data Element (DE) and Data Frame (DF), which are not defined herein, may be derived from the common data dictionary, for example, specified in ETSI TS 102 894-2.

Referring to FIG. 5, the CPM may include an ITS Protocol Data Unit (PDU) header and a plurality of containers.

The ITS PDU header is a common header including information on the protocol version, the message type, and the ITS ID of the originating V2X communication device. This ITS PDU is a common header used in the V2X message/ITS message, and exists at the starting part of the V2X message. ITS PDU header may be referred to common header, header, header part, etc.

The plurality of containers may include an Originating Vehicle Container (OVC), a Perceived (or detected) Object Container (POC), and/or a Field-of-View Container (FVC or FoVC). For example, the CPM may include an OVC as a mandatory container, and may optionally include an FVC and a POC. Hereinafter, each container will be described with reference to Tables 1 to 3.

Table 1 shows an exemplary OVC in the CPM.

TABLE 1

| DE | TS 102 894-2 [2] CDD reference |
|---|---|
| Generation Delta Time | See CAM ETSI EN 302 637-2 [3] |
| Reference Position | A.124 |
| Heading | A.112 |
| Longitudinal Speed | A.126 |
| Lateral Speed | A.126 |
| Vehicle Length | A.131 |
| Vehicle Width | A.95 |

Specifically, Table 1 shows the Data Elements (DE) and/or Data Frames (DF) included in the exemplary OVC. Here, the DE is a data type that includes single data. The DF is a data type that includes one or more elements in a predefined order. For example, the DF may be a data type that includes one or more DEs and/or one or more DFs in a predefined order.

The DE/DF may be used to configure a facility layer message or an application layer message. Examples of the facility layer messages may include CAM, CPM, DENM, and the like. In this disclosure, these messages may be referred to as V2X messages or ITS message.

As shown in Table 1, the OVC include basic information related to the V2X communication device that disseminates the CPM. The OVC may be interpreted as a scale-down version of the CAM, but may include only the DE required for a coordination transformation process. That is, although similar to the CAM, the OVC provides basic information about the originating V2X communication device. However, the included information is focused on supporting of the coordinate transformation process.

The OVC may provide the followings.
    The latest geographic position of the originating V2X communication device obtained by the CP service at the time of CPM generation.
    The lateral and longitudinal absolute velocity components of the originating V2X communication device.
    Geometric dimensions of the originating V2X communication device.

Each piece of information (DE or DF) is described below with reference to Table 1.

Generation delta time (or Generation time): as DE, indicates a time corresponding to the time of the reference position in the CPM. This may be considered as the time of CPM generation. In this disclosure, the generation delta time may also be referred to as a generation time.

Reference position: as DF, indicates the geographic position of the V2X communication device. This indicates a geographic point position. In an embodiment, the reference position may include information about latitude, longitude, position reliability and/or altitude. Here, the latitude represents the latitude of the geographic point, and the longitude represents the longitude of the geographic point. Also, the position confidence represents the accuracy of the geographic position, and the altitude represents the altitude and altitude accuracy of the geographic point.

Direction: as DF, indicates the direction in the coordinate system. In an embodiment, the direction includes information about direction values and/or direction reliability/confidence. Here, the direction value indicates the traveling direction based on the north, and the direction confidence indicates the accuracy of the reported direction value having a predefined confidence level.

Longitudinal velocity: as DF, longitudinal velocity and the accuracy of velocity information with respect to a moving object (e.g., a vehicle) may be described. In an embodiment, the longitudinal velocity includes information on velocity values and/or velocity accuracy. Here, the velocity value indicates the velocity value in the longitudinal direction, and the velocity accuracy indicates the accuracy of the reported velocity value.

Lateral velocity: as DF, lateral velocity and the accuracy of velocity information with respect to a moving object (e.g., a vehicle) may be described. In an embodiment, the lateral velocity includes information on velocity values and/or velocity accuracy. Here, the velocity value indicates the velocity value in the lateral direction, and the velocity accuracy indicates the accuracy of the reported velocity value.

Vehicle length: as DF, indicates vehicle length and accuracy indication. In an embodiment, the vehicle length includes information about a vehicle length value and/or a vehicle length accuracy indication. Here, the vehicle length indicates the length of the vehicle, and the vehicle length accuracy indication indicates an indication of the reported length value confidence.

Vehicle width: as DE, indicates the width of the vehicle. For example, the vehicle width may indicate the width of the vehicle, including the side mirrors. For example, when the vehicle width is equal to or greater than about 6.1 meters, the value needs to be set to 61. When this information is not available, the value needs to be set to 62.

Table 2 shows an exemplary FOC in the CPM.

TABLE 2

| DE | SI-Unit | Description |
|---|---|---|
| Sensor ID | — | Unique ID of sensor which is used to identify by which sensor an object has been perceived. The ID is a random number generated when the V2X device is activated and never changes until the V2X device is deactivated. |

TABLE 2-continued

| DE | SI-Unit | Description |
|---|---|---|
| Sensor Type | — | Enumeration of sensor types: undefined (0), radar (1), lidar (2), monovideo (3), stereovision (4), nightvision (5), ultrasonic (6), fusedObject (7), pmd(8) |
| Sensor Position | | |
| Position X | m | Mounting position of the sensor in negative x-direction according to the ISO 8855 [i.15] reference frame, measured from the ETSI reference position (see Clause B.19 in EN 302 637-2 [3]) |
| Position Y | m | Mounting position of the sensor in y-direction according to the ISO 8855 [i.15] reference frame, measured from the ETSI reference position (see Clause B.19 in EN 302 637-2 [3]) |
| Radius | m | Average perception range of the sensor as defined by the manufacturer |
| Opening Angle | | |
| Begin Angle | deg | Start angle of the sensor frustum in ISO 8855 [i.15] coordinate system |
| End Angle | deg | End angle of the sensor frustum in ISO 8855 [i.15] coordinate system |
| Quality Class | — | Classification of sensor defining the quality of measured objects |

The FOC provides a description/information of at least one sensor mounted onto the originating V2X communication device. When the V2X communication device is equipped with multiple sensors, the description may be added several times. For example, the FOC provides information about the sensor capabilities of the originating V2X communication device. To this end, the generic sensor characteristics which provide the mounting position of a sensor on the disseminating V2X communication device as well as the type of sensor and the range and opening angle of the sensor (i.e., the frustum of the sensor) may be included as a part of the message. This information may be used by the receiving V2X communication device to select an appropriate prediction model according to the performance of the sensor.

Each piece of information (DE or DF) is described below with reference to Table 2.

Sensor ID: This indicates a unique ID of a sensor used to identify the sensor where an object is perceived (or detected). For example, the sensor ID indicates the unique ID of the sensor that detects the object. In an embodiment, the sensor ID may be a random number generated when the V2X communication device is activated, and may not be changed until the V2X communication device is deactivated.

Sensor type: This indicates the type of sensor. That is, the sensor type is enumerated. For example, the sensor type may be undefined (0), radar (1), lidar (2), monovideo (3), stereovision (4), nightvision (5), ultrasonic (6), fusedObject (7) or pmd (8).

Sensor position: Position X indicates the mounting position of the sensor in the negative x-direction, and position Y indicates the mounting position of the sensor in the y-direction.

Radius: This indicates the average recognition range of a sensor as defined by a manufacturer.

Opening angle and End angle: The opening angle indicates the start angle of the sensor frustum and the end angle indicates the end angle of the sensor frustum.

Quality Class: This indicates classification of the sensors that define the quality of the measured objects.

Table 3 shows an exemplary POC in the CPM.

TABLE 3

| DE | TS 102 894-2 [2] CDD reference | Mandatory | Description |
|---|---|---|---|
| Time of Measurement | | Yes | Time in micro-seconds from the message reference time. Defines the relative age of the measured object. |
| Object ID | | Yes | Unique random ID assigned to object. This ID is maintained (i.e. does not change) as long as the object is tracked (i.e. considered by the disseminating ITS-S's data fusion processes). |
| Sensor ID | | Yes | Corresponds to the Sensor ID DE in Table 4. This DE is used to relate the object information to the sensor providing the measurement. |
| Longitudinal Distance | | Yes | |
| Distance Value | | Yes | Relative x-distance to object in originator reference frame ISO 8855 [i.15] |
| Distance Confidence | | Yes | Confidence of relative x-distance to object in originator reference frame ISO 8855 [i.15] |
| Lateral Distance | | Yes | |
| Distance Value | | Yes | Relative y-distance to object in originator reference frame ISO 8855 [i.15] |
| Distance Confidence | | Yes | Confidence of relative y-distance to object in originator reference frame ISO 8855 [i.15] |
| Longitudinal Speed | A.126 | Yes | Longitudinal speed of detected object along with confidence as described in CDD |
| Lateral Speed | A.126 | Yes | Lateral speed of detected object along with confidence as described in CDD |
| Object Heading | A.112 | No | Absolute orientation of object in WGS84 reference frame, if provided by data fusion process |
| Object Length | | No | |
| Length Value | | No | Measured length of the object |
| Length Confidence | | No | Confidence of measured length of the object |
| Object Width | | No | |
| Width Value | | No | Measured width of the object |
| Width Confidence | | No | Confidence of measured width of the object |
| Object Type | A.78 | No | Classification of object, if provided by data fusion process |

The POC is used to describe the object perceived by the sensor in terms of the transmitting V2X communication device. Upon POC reception, the receiving V2X communication device may perform the coordinate transformation process with the help of the OVC to convert the position of the object into the reference frame of the reception vehicle. In order to reduce the message size, several optional DEs may be provided, which may be used when the originating V2X communication device may provide this DE.

The POC may be configured with selection of DEs to provide an abstract description of the perceived (or detected) object. For example, relative distance and velocity information and timing information about the perceived (or detected) object related to the originating V2X communication device may be included in the POC as a mandatory DE. In addition, when the sensor of the originating V2X communication device can provide the requested data, additional optional DEs may be provided.

Each piece of information (DE or DF) is described below with reference to Table 3.

Measurement time: This indicates a time of microsecond unit from the message reference time. This may define the relative lifetime of the measured object.

Object ID: This indicates a unique random ID assigned to an object. This ID is maintained (i.e., is not changed) as long as the object tracks (i.e., as long as being considered by a data fusion process of the disseminating V2X communication device).

Sensor ID: This is an ID corresponding to the sensor ID DE in Table 2. This DE may be used to correlate object information with a sensor that provides measurement.

Longitudinal distance and Distance confidence for longitudinal distance: The distance value indicates a relative distance x to the object in the originator reference frame, and the distance confidence indicates the confidence of a relative distance x to the object in the originator reference frame.

Lateral distance and Distance confidence for lateral distance: The distance value indicates a relative distance x to the object in the originator reference frame, and the distance confidence indicates the confidence of a relative distance x to the object in the originator reference frame.

Longitudinal speed: This indicates the longitudinal velocity of the detected object according to the confidence.

Lateral speed: This indicates the lateral velocity of the detected object according to the confidence.

Object direction: When provided by the data fusion process, in the reference frame, this indicates the absolute direction of the object.

Object length and Length confidence for object length: The length value indicates the measured length of the object, and the length confidence indicates the confidence of the measured length of the object.

Object width and Width confidence for object width: The width value indicates the measured width of the object, and the width confidence indicates the confidence of the measured width of the object.

Object type: This indicates the classification of the object, when provided by the data fusion process.

FIG. 6 illustrates a method of extracting sensor data by a V2X communication device providing a CP service according to an exemplary embodiment of the present disclosure. More specifically, FIG. 6A illustrates how the V2X communication device extracts sensor data at a low level, and FIG. 6B illustrates how the V2X communication device extracts sensor data at a high level.

The source of the sensor data to be transmitted as a part of any CPM need to be selected according to the requirements of the prospective data fusion process on the receiving V2X communication device. Generally, the transmitted data need to be as close as possible to the original sensor data. However, simple transmitting of the original sensor data, for example, raw data is not a viable solution. This is because the transmitting of the original sensor data imposes very high requirements in regard to the data rate and transmission period. FIGS. 6A and 6B show possible implementations for selecting data to be transmitted as a part of the CPM.

In the embodiment of FIG. 6A, sensor data are obtained from different sensors, and are processed as a part of a low-level data management entity. This entity may not only select the object data to be inserted as a part of the next CPM, but also calculate the plausibility of the detected object. In the case of FIG. 6A, since the data of each sensor are transmitted, the amount of data transmitted through the V2X network is increased, but the sensor information may be efficiently used at the receiving V2X communication device.

In the embodiment of FIG. 6B, the sensor data or the object data provided by the data fusion process specific to a V2X communication device manufacturer are transmitted as a part of the CPM. In the case of FIG. 6B, since the integrated sensor data collected into one through the data fusion block are transmitted, there is an advantage in that the amount of data transmitted through the V2X network is small. However, there is a disadvantage of being dependent on the collection method of the V2X communication device collecting the sensor information. In this case, since different data fusion processes can be implemented by different manufacturers, this implementation method is not generally preferred to FIG. 6A.

On the other hand, regardless of the implementation type, whenever the object is detected by the sensor of the V2X communication device, the plausibility thereof needs to be calculated. When the plausibility of the object exceeds a given threshold PLAUS_OBJ, the transmission needs to be considered. For example, when an absolute difference between the current yaw-angle of the detected object and the yaw angle included in the CPM previously transmitted by the originating V2X communication device exceeds about 4 degrees, when a relative distance between the current positions of the originating V2X communication device and the detected object and a relative position difference between the originating V2X communication device and the detected object included in the CPM previously transmitted by the originating V2X communication device exceeds about 4 meters, or when an absolute difference between the current velocity of the detected object and the velocity included in the CPM previously transmitted by the originating object exceeds about 0.5 m/s, the transmission may be considered.

The CAM is a technology in which a vehicle provided with a V2X module periodically transmits its position and state to a surrounding V2X vehicle to help more stable driving. However, the existing CAM had a limitation of sharing only information of its own vehicle, and thus a collective perception service (CPS) technology is being discussed to complement this. Because vehicles equipped with an ADAS technology are constantly increasing, many vehicles are equipped with sensors such as camera, radar, Lidar, etc. to recognize many surrounding vehicles and perform a driving driver assistance function. The CPS technology is a technology that informs the surroundings of sensor data recognizing a surrounding environment through V2X communication in an ADAS.

The present disclosure proposes an effective managing method of the CPS technology transmitting information of the surrounding vehicle and a communication algorithm suitable for a V2X communication environment, in order to complement the CAM message transmitting only information of its own vehicle.

FIG. 7 illustrates CP service, as an embodiment to which the present disclosure is applicable.

Referring to FIG. 7, it is assumed that each of TxV1 and RxV2 vehicles is equipped with at least one sensor and has a sensing range shown by the dotted line.

The TxV1 vehicle having a CPS function may recognize RV1 to RV11 vehicles, that are surrounding objects belonging to the sensing range, using several ADAS sensors mounted on the TxV1 vehicle. Object information obtained as described above may be delivered to surrounding vehicles equipped with a V2X receiver through the V2X communication. For example, an RxV1 vehicle not having the sensor among the surrounding vehicles receiving a CPS message can obtain information of the vehicles that follow the RxV1 vehicle, and an RxV2 vehicle equipped with the sensor can also obtain information of an object that is out of a sensing range of the RxV2 vehicle or is positioned at a blind spot.

As illustrated in FIG. 3 above, to this end, the facilities layer can provide the above-described CP service. That is, the CP service may be performed in the facilities layer and may use the services that internally exist in the facilities layer. Here, a local dynamic map (LDM) is a service providing a map and may provide map information for the CP service. A position and time (POTI) is a service providing a position of the vehicle and time and may provide a position of its own vehicle and exact time using the corresponding information. A vehicle data provider (VDP) is a service providing information about the vehicle and may transmit by loading information, such as the size of its own vehicle, on the CPM using this.

The ADAS vehicles are equipped with various sensors, such as a camera, an infrared sensor, radar, and Lidar, for the purpose of a driver driving assistance. The respective sensors may individually recognize an object, and object information recognized thus may be collected and fused by a data fusion block and may be provided to an ADAS application. Referring again to FIG. 6 above, for the CP service, a method of collecting (or fusing) sensor information in the existing ADAS technology is described.

An existing sensor for ADAS or an existing sensor for CPS may always track surrounding objects and collect relevant data. In this case, when sensor values for CPS service are used, sensor information may be collected using two methods. Referring to FIG. 6(a), the respective sensor values may be individually provided to the surrounding vehicles through the CP service. As illustrated in FIG. 6(a), because information is transmitted for each sensor, an amount of data transmitted through the V2X increases, but there is an advantage in that a receiving system can efficiently utilize each piece of sensor information. Referring to FIG. 6(b), integrated sensor information collected into one after the data fusion block may be provided to the CP service. In such a case, there is an advantage in that a size of the CPM message sent via the V2X decreases, but there is a disadvantage that it is dependent on a collection method of the vehicle collecting sensor information.

FIG. 8 illustrates a structure of a CPM message according to an embodiment to which the present disclosure is applicable.

Referring to FIG. 8, a CPM message may include header, originating station container (OSC), sensor information container (SIC), and perceived object container (POC) fields (or data, information, containers).

The header may include 'protocolVersion', 'messageID', 'stationID' and/or 'generationDeltaTime' fields. The respective fields represent, in turn, a version of protocol, an ID for distinguishing messages, an ID for distinguishing stations, and time at which the messages are generated.

The OSC field used to transmit information of its own vehicle may include 'BasicContainer' field and/or 'StationData' field. The stations may be roughly distinguished into a vehicle and a road side unit (RSU), and 'StationData' field suitable for this may exist. Commonly needed originating station information may be included in the 'BasicContainer' field. The 'BasicContainer' field of the OSC may include 'referencePosition' field representing a reference position of the vehicle transmitting the CPM and 'stationType' field representing a station type (e.g., vehicle, RSU). The 'StationData' field of the OSC may be defined differently depending on the station type. If the station is the vehicle, the 'StationData' field may include 'OrignatingVehicleContainer' field, and the 'OrignatingVehicleContainer' field may include 'Heading', 'Speed', 'OrientationDeltaAngle', 'driveDirection', 'Acceleration' and/or 'trailerData' fields (or data, information, containers). The respective fields may represent, in turn, a vehicle's driving direction, a vehicle's driving speed, an angle between the vehicle's driving direction and the vehicle's front, a vehicle's acceleration, and trailer information. If the station is the RSU, the 'StationData' field may include 'intersectionReferenceID' field and/or 'RoadSegmentationID' field, and the respective fields may represent an intersection identification ID and a road ID.

The SIC represents a container used to deliver installation/function information of the sensor used to detect the object. The SIC may include a vehicle sensor field or an RSU sensor field depending on the station type. The vehicle sensor field may include SensorID representing an ID of the sensor, SensorType representing a type of the sensor, offset data (represented by offset based on xOffset, yOffset, zOffset, and referencePosition) representing a position of the sensor, and/or data representing a measuring range (range, horizontalFrustumStart/End, verticalFrustumStart/End, measuring distance, horizontal measuring range, vertical measuring range) of the sensor. The RSU sensor field may include SensorID representing an ID of the sensor, offset information (represented by offset based on xOffset, yOffset, zOffset, and referencePosition) representing a position of the sensor, and/or data representing a measuring range (range, horizontalFrustumStart/End, verticalFrustumStart/End, measuring distance, horizontal measuring range, vertical measuring range) of the sensor.

The POC is a container that contains information of surrounding objects collected through the sensors. 'ObjectData' field including each object information is generated according to the number of measured objects. For example, if four objects are measured, four object data may be included in the POC field.

The object data may include 'ObjectID' representing an ID of the object, data 'SensorID' and 'TimeOfMeasurement' representing a sensor and time used in the measurement, position information ('xDistance', 'yDistance', 'zDistance'; representing x-distance, y-distance, and z-distance at 'referencePosition') of the measured object, motion information ('xSpeed', 'ySpeed', 'zSpeed', 'xAcceleration', 'yAcceleration', 'zAcceleration'; representing speed and acceleration at x-axis, y-axis, and z-axis) of the object, size information ('planarObjectDimension1', 'planarObjectDimension1', 'verticalObjectDimension'; informing size and height values of the horizontal plane that the object has) of the object, and/or state information ('classification', 'lanePosition', 'intersectionTopologyPositoin'; vehicle type of the object, lane information of the object, and intersection position information of the object) of the object.

FIG. 9 illustrates a method of managing a CPM message according to an embodiment of the present disclosure.

Referring to FIG. 9, a V2X vehicle may continuously track a surrounding object using a sensor and may manage a position and a state of the object, in order to provide CPS service. The V2X vehicle may generate a CPM message using its own vehicle information and information of the tracked object. The CPM message generated thus passes through the network and transport layer and the access layer and is generated as V2X packet. The V2X vehicle may transmit, to a surrounding V2X vehicle, object information sensed in a vehicle performing the CPS service through a RF module according to a preset (or pre-assigned) message transmission period.

A V2X message generated as illustrated in FIG. 9 may be periodically transmitted on an RF channel. When it comes to its own transmission period (t1 time), the V2X vehicle sends the generated V2X message to a surrounding vehicle. Time at which the message is actually transmitted corresponds to $T_{on}$ and means a time occupying the channel. When the number of sensors increases or the number of sensed objects increases, a size of the CPM message may increase and a value of $T_{on}$ may increase in proportion to it. The V2X message is periodically sent and is sent at the t1 time, and then the V2X message may be sent again at time t2 and time t3. In this instance, the V2X message sent at time t2 and time t3 may be a message generated using newly updated object information. A transmission period in which the V2X message is transmitted may be denoted by Tinterval. The transmission period may be fixedly determined, and adjusted according to a channel load, for example, as in the case where DCC technology is applied.

FIG. 10 illustrates a method of managing a CAM message according to an embodiment of the present disclosure.

Referring to FIG. 10, in cooperative awareness (CA) service, an upper bound and a lower bound of a transmission interval (or transmission period) of a CAM may be determined (or set). A message transmission time (or generation time) may be determined between the transmission intervals depending on a trigger condition. The trigger condition of the message may be defined for each message. The following Table 4 shows an example of the trigger condition of the CAM message.

TABLE 4

In detail the CAM generation trigger conditions shall be as follows:
1) The time elapsed since the last CAM generation is equal to or greater than T_GenCam_Dcc and one of the following ITS-S dynamics related conditions is given:
   the absolute difference between the current heading of the originating ITS-S and the heading included in the CAM previously transmitted by the originating ITS-S exceeds 4°;
   the distance between the current position of the originating ITS-S and the position included in the CAM previously transmitted by the originating ITS-S exceeds 4 m;
   the absolute difference between the current speed of the originating ITS-S and the speed included in the CAM previously transmitted by the originating ITS-S exceeds 0.5 m/s.
2) The time elapsed since the last CAM generation is equal to or greater than T_GenCam and equal to or greater than T_GenCam_Dcc.

Referring to FIG. 4, whether to generate (or transmit) the CAM may be determined by comparing the following three vehicle states from the case in which time is equal to or greater than T_GenCam_Dcc, where T_GenCam_Dcc denotes a lower bound of a CAM transmission interval. In embodiments, T_GenCam_Dcc may be pre-set as a fixed value and may be changed depending on a channel state or a channel environment.

if an angle difference between a heading of the vehicle included in the CAM message previously transmitted and a heading of the current vehicle exceeds 4°
  if a difference between a position of the vehicle included in the CAM message previously transmitted and a position of the current vehicle exceeds 4 m
  if a difference between a speed of the vehicle included in the CAM message previously transmitted and a speed of the current vehicle exceeds 0.5 m/s If all the three conditions are not satisfied, the CAM message may be generated at time of T_GenCam. In the present disclosure, the vehicle is in a dynamic state if the trigger condition is satisfied, and the vehicle is in a stable state if the trigger condition is not satisfied, where T_GenCam denotes an upper bound of the CAM transmission interval. That is, if the state of the vehicle transmitting the CAM satisfies the set trigger condition, the CAM may be short transmitted at an interval set in DCC. If the state of the vehicle does not satisfy the trigger condition, the CAM may be transmitted in a maximum period.

The trigger condition needs to be defined in the CP service as well as the CA service. Hence, a method of using the above-described trigger condition of CAM based on the state of surrounding objects is recently under discussion. However, unlike the CAM sending its own vehicle state, in the CPM, whether to send the CPM is determined based on the state of surrounding objects. A subject to be triggered is always the vehicle in the CAM, while in the CPM, a subject to be triggered may be not only the vehicle but also a vulnerable road user (VRU) (e.g., bicycles, pedestrians, etc.), an obstacle (e.g., drop box, illegal parking, road kill, etc.), and the like. Considering this, a different approach is required in the CPM that grasps a state of objects through the sensing.

Accordingly, the present disclosure proposes a method of triggering a CPS message. In embodiments, the proposed method may include the following three steps. The first step is to calculate state values of objects, the second step is to select/collect state values of several objects, and the third step is to trigger the CPM based on a calculated condition value. Embodiments of the present disclosure are not limited thereto. For example, one or more steps of the above-described three steps may be omitted, and other step may be added. A method of calculating the state values (or condition value, trigger condition value) of the objects is first described below.

In embodiments of the present disclosure, a V2X vehicle (or V2X communication device) may generate (or transmit) a CPM message based on an absolute orientation (or angle), distance, and speed of an object. That is, a trigger condition for generating (or transmitting) the CPM message may be set based on the absolute orientation (or angle), distance, and speed of the object. In embodiments, each state value may be determined by a difference between orientation (or angle), distance, and speed values of the corresponding object included in the previously transmitted CPM message and current values. For example, the state value may be calculated using the following Equation 1.

$$\text{diff\_Angle}_{RV_n}{}^{tk} = \text{Angle}_{RV_n}{}^{tk} - \text{Angle}_{RV_n}{}^{tk-1}$$

$$\text{diff\_Position}_{RV_n}{}^{tk} = \sqrt{(X\text{pos}_{RV_n}{}^{tk} - X\text{pos}_{RV_n}{}^{tk-1})^2 + (Y\text{pos}_{RV_n}{}^{tk} - Y\text{pos}_{RV_n}{}^{tk-1})^2}$$

$$\text{diff\_Speed}_{RV_n}{}^{tk} = \text{Speed}_{RV_n}{}^{tk} - \text{Speed}_{RV_n}{}^{tk-1} \quad \text{[Equation 1]}$$

Where Tk denotes a current time, and Tk−1 denotes a time at which the CPM is previously transmitted. That is, the trigger condition may include an orientation difference, a position difference, and/or a speed difference of the object.

In embodiments of the present disclosure, the V2X vehicle (or V2X communication device) may generate (or transmit) a CPM message based on a relative orientation (or angle), distance, and speed of an object. That is, a trigger condition for generating the CPM message may be set based on a relative orientation, distance, and speed between a V2X vehicle transmitting a CPS message and the object.

The vehicle transmitting the CPS message may acquire state information of surrounding objects by sensing (or detecting) the surrounding objects. Based on this, the vehicle may generate/transmit the CPS message. If the surrounding objects drive in a state similar to the own vehicle, it is relatively less necessary to frequently inform the surroundings of the state of the surrounding objects. On the other hand, if the surrounding objects sharply change, it means that there is a high possibility that there is a change in the driving state of the surrounding objects or there is a risk factor. In this case, the V2X vehicle sending the CPS message needs to send a message about the state of the surrounding objects to surrounding V2X vehicles in a short period. To this end, in this embodiment, the V2X vehicle can set the trigger condition for generating (or sending) the CPM message using a relative distance change, a relative angle difference, and a relative speed difference.

FIG. 11 illustrates a method of managing a CPM message according to an embodiment of the present disclosure.

With reference to FIG. 11, a triggering management method depending on changes in a relative distance to a TxV1 vehicle transmitting a CPS is illustrated. To this end, the TxV1 vehicle may measure changes in a distance between its own vehicle and an object. First, the TxV1 vehicle may measure distances between its own vehicle and objects perceived in the surroundings. In embodiments, the distances between its own vehicle and the objects may be calculated using the following Equation 2.

$$\text{dist}_{RVn} = \sqrt{(X\text{pos}_{RVn} - X\text{pos}_{TxVn})^2 + (Y\text{pos}_{RVn} - Y\text{pos}_{TxVn})^2} \quad \text{[Equation 2]}$$

The TxV1 vehicle may calculate a difference between a distance value of a current time calculated using the above Equation 2 and a distance value of a time, at which the CPM is previously transmitted, using the following Equation 3.

$$\text{diff\_Distance}_{RVn}^{tk} = \text{dist}_{RVn}^{tk} - \text{dist}_{RVn}^{tk-1} \quad \text{[Equation 3]}$$

FIG. 12 illustrates a method of managing a CPM message according to an embodiment of the present disclosure.

With reference to FIG. 12, a triggering management method depending on changes in a relative speed to a TxV1 vehicle transmitting a CPM is illustrated. To this end, the TxV1 vehicle may measure a speed difference between its own vehicle and an object. In embodiments, the speed difference may be calculated using the following Equation 4.

$$\text{diff\_Speed}_{RVn}^{tk} = \text{Speed}_{RVn}^{tk} - \text{Speed}_{TxV1}^{tk} \quad \text{[Equation 4]}$$

With reference to Equation 4, the TxV1 vehicle may determine whether the trigger condition for generating (or sending) the CPM message is satisfied, using a difference between a speed of RVn and a speed of the TxV1 vehicle.

FIG. 13 illustrates a method of managing a CPM message according to an embodiment of the present disclosure.

With reference to FIG. 13, a triggering management method depending on changes in a relative moving orientation to a TxV1 vehicle transmitting a CPM is illustrated. To this end, the TxV1 vehicle may measure a moving orientation difference between its own vehicle and an object. In embodiments, the moving orientation difference may be calculated using the following Equation 5.

$$\text{diff\_Angle}_{RVn}^{tk} = \text{Angle}_{RVn}^{tk} - \text{Angle}_{TxV1}^{tk} \quad \text{[Equation 5]}$$

With reference to Equation 5, the TxV1 vehicle may determine whether the trigger condition for generating (or sending) the CPM message is satisfied, using a difference between a moving orientation of RVn and a moving orientation of the TxV1 vehicle.

In embodiments of the present disclosure, the V2X vehicle may set the trigger condition for generating (or sending) the CPM message based on states of a plurality of objects. In the CAM, a vehicle to which conditions are to be compared is only its own vehicle. Unlike this, in the CPM, there may be multiple objects to which conditions are to be compared.

In this embodiment, the V2X vehicle may calculate and use an average value of a plurality of object state values and may also use a maximum value of the plurality of object state values. If the maximum value is used, the V2X vehicle may extract a maximum value of 1 to n state changes (i.e., distance changes, speed differences, and moving orientation differences) that are individually calculated. In this case, a difference value represents an object with a relatively large change, and thus an operation sensitive to the object change may be possible. For example, the maximum value may be calculated using the following Equation 6.

$$\text{diff}_{max}^{tk} = \max(\text{diff}_{RVn}^{tk}) \quad \text{[Equation 6]}$$

As another example, if the average value is used, the average value may be calculated using the following Equation 7. If the average value of the plurality of object state values is used, the more stable operation is possible.

$$\text{diff}_{avg}^{tk} = \left(\sum_{n=1}^{N} \text{diff}_{RVn}^{tk}\right)/N \quad \text{[Equation 7]}$$

The V2X vehicle may adjust a transmission period (or transmission interval) of the CPS message using information about the state difference (or state change) of the object calculated by the above-described methods. If the object travels at the same speed as the TxV1 vehicle transmitting the CPM without any special change, object information transmitted on the CPS service is inevitably less useful. On the other hand, if there is a sudden state change of the object or a change in the TxV1 vehicle transmitting the CPM, the difference value may sharply change. In this instance, since the utility of information transmitted on the CPS service increases, the corresponding information needs to be transmitted more frequently.

The present disclosure proposes a hard triggering method using a threshold and a soft triggering method of adjusting a period depending on changes, as a method of adjusting a transmission period of the CPM message. The hard triggering method is first described below.

FIG. 14 illustrates a method of adjusting a transmission period of a CPM message according to an embodiment of the present disclosure.

Referring to FIG. 14, a V2X vehicle may compare a state difference (or state change) of an object with a preset threshold and adjust a transmission rate (or transmission period or transmission interval) of a CPM message. The state difference may be calculated using the methods described above with reference to FIGS. 10 to 13. For example, the CPM message may have a maximum period of 1000 msec and a minimum period of 200 msec. The message transmission period in a corresponding duration may be adjusted depending on the state of the object.

If a difference value (e.g., difference in distance, speed, and moving orientation) is less than a first threshold Threshold1, it may mean that a relative movement of the object is small. In this case, the CPM message may be transmitted as late as possible in the transmission period (e.g., Tinterval=1000 msec).

For example, if the difference value exceeds a fourth threshold Threshold4 that is a maximum value, the V2X vehicle may transmit a CPS message in a minimum period (200 msec). If the difference value is between a maximum value and a minimum value of the preset thresholds, the message transmission period may be compared with a threshold set between the maximum value and the minimum value, and may be adjusted. The transmission period may be calculated using the following Equation 8.

$$T_{interval} = \begin{cases} 1000\,msec, & \text{if } diff_{max}^{t_k} < threshold_1 \\ 200 + (N-1) \times \Delta\,msec, & \text{if } threshold_1 \leq diff_{max}^{t_k} < threshold_2 \\ \vdots & \vdots \\ 200 + \Delta\,msec & \text{if } threshold_{N-1} \leq diff_{max}^{t_k} < threshold_N \\ 200\,msec, & \text{if } diff_{max}^{t_k} > threshold_N \end{cases} \quad [\text{Equation 8}]$$

Referring to FIG. 8, the transmission period Tinterval may be determined by a pre-defined period (or interval) through a comparison between the difference value and the threshold. As described above, if the plurality of objects are used, the maximum value or the average value may be used as the difference value. Herein, N value indicating the number of set thresholds and a delta value indicating a transmission interval gap may be set suitably for a system.

FIG. 15 illustrates a method of adjusting a transmission period of a CPM message according to an embodiment of the present disclosure.

Referring to FIG. 15, when DCC technology is applied, a maximum transmission rate capable of transmitting may be adjusted depending on a channel busy ratio (CBR). That is, in this case, the maximum transmission rate (or minimum transmission period) may be determined depending on the CBR in a period a higher than a lower bound of a transmission period. If the state difference exceeds the maximum threshold, a low bound of the Tinterval has a value $T_{interval}^{DCC}$ calculated through a DCC operation.

Specifically, the Tinterval value may be set to $T_{interval}^{DCC}$ if the difference value exceeds the maximum value of the thresholds as shown by the following Equation 9.

$$T_{interval} = \begin{cases} 1000\,msec, & \text{if } diff_{max}^{t_k} < threshold_1 \\ T_{interval}^{DCC} + (N-1) \times \Delta\,msec, & \text{if } threshold_1 \leq diff_{max}^{t_k} < threshold_2 \\ \vdots & \vdots \\ T_{interval}^{DCC} + 1 \times \Delta\,msec, & \text{if } threshold_{N-1} \leq diff_{max}^{t_k} < threshold_N \\ T_{interval}^{DCC} & \text{if } diff_{max}^{t_k} > threshold_N \end{cases} \quad [\text{Equation 9}]$$

FIG. 16 illustrates a method of adjusting a transmission period of a CPM message according to an embodiment of the present disclosure.

Referring to FIG. 16, the threshold may consist of two values. In this case, the Tinterval may be divided into three steps. Since the difference value is equal to or less than the first threshold for time T1 to T2, the Tinterval may be set to 1000 msec that is the maximum transmission period. Since the difference value is between the first threshold and the second threshold for time T2 to T3, the Tinterval may be set to 500 msec. For time after a time T3 at which the object's movement is the largest, the Tinterval may be set to 200 msec that is the minimum transmission period because the difference value exceeds the second threshold. Next, the soft triggering method is described below.

FIG. 17 illustrates a method of adjusting a transmission period of a CPM message according to an embodiment of the present disclosure.

Referring to FIG. 17, the V2X vehicle may adjust a transmission rate (or transmission period or transmission interval) of the CPM message by directly using a state difference of an object. A state difference may be calculated using the methods described above with reference to FIGS. 10 to 13. For example, the CPM message may have a maximum period of 1000 msec and a minimum period of 200 msec. A message transmission period in a corresponding duration may be adjusted depending on a state of an object. In this instance, the following Equation 10 may be used.

$$T_{interval} = \begin{cases} 200\,msec, & \text{if } diff_{max}^{t_k} > diff_{lowbound} \\ 200 + a \times diff_{max}^{t_k}, & \text{if } diff_{upperbound} \leq diff_{max}^{t_k} < diff_{upperbound} \\ 1000\,msec, & \text{if } diff_{max}^{t_k} \leq diff_{upperbound} \end{cases} \quad [\text{Equation 10}]$$

Referring to Equation 10, DiffUpperbound denotes a lower bound of a difference value, and Difflowerbound denote an upper bound of the difference value. If the difference value is less than DiffUpperbound, it means that a relative movement of the object is small. In this case, the V2X vehicle may transmit the CPS message in the maximum transmission period (i.e., Tinterval=1000 msec). If the difference value exceeds the set maximum value Difflowerbound, the V2X vehicle may transmit the CPS message in the minimum transmission period (i.e., Tinterval=200 msec). That is, when the difference value has a value between the lower bound and the upper bound, the message transmission period Tinterval may be directly adjusted based on the difference value.

As described above, if a plurality of objects are used, a maximum value or an average value may be used as the difference value. Herein, an alpha value that is a coefficient applied to the difference value may be previously set suitably for a system.

FIG. 18 illustrates a method of adjusting a transmission period of a CPM message according to an embodiment of the present disclosure.

Referring to FIG. 18, when DCC technology is applied, a maximum transmission rate capable of transmitting may be adjusted depending on a channel busy ratio (CBR). That is, in this case, a maximum transmission rate (or minimum transmission period) may be determined depending on the CBR in a period a higher than a lower bound of a transmission period. That is, in this embodiment, a low bound of the Tinterval has a value Tinterval ($T_{interval}^{DCC}$) calculated through a DCC operation.

For example, the CPM message may have a maximum period of 1000 msec and a minimum period of 200 msec. A message transmission period in a corresponding duration may be adjusted depending on a state of an object. In this instance, the following Equation 11 may be used.

$$T_{interval} = \begin{cases} T_{interval}^{DCC} \, msec, & \text{if } diff_{max}^{t_k} > diff_{lowbound} \\ T_{interval}^{DCC} + a \times diff_{max}^{t_k}, & \text{if } diff_{upperbound} \leq diff_{max}^{t_k} < diff_{upperbound} \\ 1000 \, msec, & \text{if } diff_{max}^{t_k} \leq diff_{upperbound} \end{cases}$$

[Equation 11]

Referring to Equation 11, if a difference value exceeds a maximum value of thresholds, the Tinterval may be set to $T_{interval}^{DCC}$. If the difference value does not exceed the maximum value of the thresholds and exceeds a minimum value of the thresholds, the V2X vehicle may set the Tinterval to a value obtained by adding $T_{interval}^{DCC}$ to a value by multiplying an alpha value by a value $diff_{max}^{t_k}$.

FIG. 19 illustrates a method of adjusting a transmission period of a CPM message according to an embodiment of the present disclosure.

With reference to FIG. 19, an operation of soft triggering (or soft controlling) the Tinterval depending on a difference value is illustrated. Duration T1 to T2 corresponds to when the difference value is equal to or less than a minimum value (i.e., low bound) of thresholds. In this case, the Tinterval may be set to 1000 msec that is a maximum period. Duration T3 to T4 corresponds to when the difference value exceeds a maximum value (i.e., upper bound) of the thresholds, and the Tinterval may be set to 200 msec that is a minimum period. As described above with reference to FIG. 18, when DCC is applied, the minimum period may be changed (adjusted). Duration T2 to T3 corresponds to when the difference value is between the maximum value and the maximum value of the thresholds. In this case, the Tinterval may be set to be proportional to the difference value. In this instance, the above Equation 10 or 11 may be used.

In embodiments, the V2X vehicle may calculate the respective Tinterval values based on the above-described absolute state and/or relative state. The V2X vehicle may select a minimum value of the respective calculated Tinterval values to determine a final Tinterval. In this case, the following Equation 12 may be used.

$$T_{interval}^{CPM} = \min \begin{Bmatrix} T_{interval}^{absolute\_speed}, T_{interval}^{absolute\_angle}, T_{interval}^{absolute\_position}, \\ T_{interval}^{related\_speed}, T_{interval}^{related\_angle}, T_{interval}^{related\_distance}, T_{interval}^{max} \end{Bmatrix}$$

[Equation 12]

FIG. 20 is a flow chart illustrating a method of generating a CPM message according to an embodiment of the present disclosure.

Referring to FIG. 20, if a CPS service providing system starts, a V2X vehicle (or V2X communication device) initializes the system in S20010.

The V2X vehicle processes a sensor received from an initialized sensor module through the sensing in S20020, and acquires (or extracts or detects) surrounding object information in S20030.

Afterwards, the V2X vehicle may perform a triggering process operation proposed by the present disclosure (i.e., methods described above with reference to FIGS. 10 to 19) in order to generate/transmit a CPS message. Specifically, the V2X vehicle may calculate an absolute state value and/or a relative state value based on object state information (e.g., moving orientation, speed, position) in S20040.

If a plurality of objects exists, the V2X vehicle may select state values of the objects in order to determine whether a trigger condition is satisfied, in S20050. For example, a maximum value, a median value, and an average value of the state values of the plurality of objects may be used. The V2X vehicle may store the state values of the objects in a memory in S20070. The stored state values of the objects may be used to generate a next CPM message.

The V2X vehicle may perform the triggering for transmitting (or generating) of the CPM message based on the detected states of the objects in S20060.

The V2X vehicle determines whether the trigger condition is satisfied, based on the detected states of the objects in S20070. When the trigger condition is satisfied, the V2X vehicle generates the CPM message in S20100.

When the trigger condition is not satisfied, the V2X vehicle determines whether to transmit the CPM message through a comparison with an upper bound of a transmission interval in S20080. That is, if the upper bound (e.g., 1000 ms) of the transmission interval passes after the CPM message is previously transmitted, the V2X vehicle may generate the CPM message.

The CPM message generated in the step S20100 may be generated as a packet while passing through the networks and transport layer and the access layer in S20110 and S20120, and may be transmitted wirelessly. Afterwards, if the system is not terminated, the V2X vehicle may periodically provide CPS service by acquiring again sensor information.

A moving orientation, a position, and a speed that are defined in the existing triggering scheme of CAM and CPM reflect characteristics of a vehicle. That is, the existing triggering scheme focuses on when a V2X vehicle or an object corresponds to a vehicle. For example, for a system that performs transmission in a period of 200 msec in order to generate a position change of 4 meters at which the triggering occurs, an object shall travel at least 70 km/h. In addition, if there is only VRU on the road, it is difficult to change the position of 4 meters or change a speed of 0.5 m/s for 200 msec. Nevertheless, in the case of an object other than a vehicle such as a VRU, the risk may further increase because the object does not travel on a designated road. In such a case, a problem occurring in the existing scheme focusing on only when the object is a vehicle will be described with reference to the following figures.

FIG. 21 illustrates an example of a triggering method according to types of objects, as an embodiment to which the present disclosure is applicable.

With reference to FIG. 21, an example of performing the triggering regardless of types of objects is illustrated. FIG. 21(a) illustrates a situation in which a TxV1 vehicle performing CPS service is driving on the road for a predetermined time, a VRU is moving around the road, and a vehicle is driving around the road. FIG. 21(b) is a graph illustrating a comparison between states of the objects, and FIG. 21 assumes a comparison of a difference between speeds of the objects. If a speed difference threshold is set to 0.5 km/h based on a state of the vehicle, a state of the VRU that is sensed when travelling for time T1 to T2 is not triggered. FIG. 21(c) illustrates a CPM message generated depending on trigger condition. In the time duration T1 to T2 in which the VRU exists until it is triggered by RV1, the CPM message is transmitted in the latest period.

That is, if the same standard as the existing one is applied, there is a problem in that the CPM message is not triggered and is transmitted at a minimum transmission interval although a high-risk situation may occur when the object is not a vehicle. Thus, the present disclosure proposes a multi-triggering structure for generating (transmitting) the CPM message based on types of objects, in order to solve the problem.

FIG. 22 illustrates an example of a multi-triggering method according to types of objects, as an embodiment to which the present disclosure is applicable.

FIG. 22(a) illustrates a situation in which a TxV1 vehicle performing CPS service is driving together with VRUs and is driving together with other vehicles for a predetermined time. FIG. 22(b) is a graph illustrating a comparison between states of the objects, and FIG. 22 assumes a comparison of a difference between speeds of the objects.

In the multi-triggering scheme according to the embodiment, the V2X vehicle may apply different thresholds depending on types of objects. For example, a threshold for satisfying the trigger condition may be set to 0.2 km/h when the surrounding object is the VRU, and the threshold may be set to 0.5 km/h when the surrounding object is the vehicle. In this case, before the time T1 to T2, the VRU is not triggered in FIG. 21, but may be triggered in FIG. 22. FIG. 22(c) illustrates a CPM message transmitted in the multi-triggering structure. The CPM message in the time duration T1 to T2 in which the VRU exists may be triggered and transmitted, and the CPM message in the time duration T4 to T5 in which the RV1 exists may be triggered and transmitted FIG. 23 is a flow chart illustrating a method of generating a CPM message according to an embodiment of the present disclosure.

Referring to FIG. 23, it is assumed that there is a plurality of objects to be detected (or sensed or acquired).

First, if a CPS service providing system starts, a V2X vehicle (or V2X communication device) initializes the system in S23010.

The V2X vehicle processes a sensor received from an initialized sensor module through the sensing in S23020, and acquires (or extracts or detects) surrounding object information in S23030.

Afterwards, the V2X vehicle may perform a triggering process operation proposed by the present disclosure (i.e., methods described above with reference to FIGS. 10 to 19) in order to generate/transmit a CPS message. Specifically, the V2X vehicle may calculate an absolute state value and/or a relative state value based on object state information (e.g., moving orientation, speed, position) in S23040. The V2X vehicle may obtain an object classification value in S23050.

The V2X vehicle may use a classification field in a CPM message to classify the objects. The V2X vehicle separately groups vehicles from the plurality of detected objects to select an average value or a maximum value of a plurality of object state values in S23060, and determines whether a trigger condition is satisfied based on this in S23070. The V2X vehicle separately groups VRUs from the plurality of detected objects to select an average value or a maximum value of a plurality of object state values in S23080, and determines whether the trigger condition is satisfied based on this in S23090. In this instance, as described above, the trigger condition applied to the VRU may have a parameter considering a movement of the VRU, unlike the vehicle.

The V2X vehicle selects a final transmission interval among a transmission interval of the vehicle group and a transmission interval of the VRU group in S23100. In this instance, the following Equation 13 may be used.

$$T_{interval}^{CPM} = \min\{T_{interval}^{Vehicle}, T_{interval}^{VRU}\} \qquad \text{[Equation 13]}$$

The V2X vehicle performs the triggering for transmitting (or generating) the CPM message based on the state of the detected object. That is, the V2X vehicle determines whether the trigger condition is satisfied based on the state of the detected object in S23120. When the trigger condition is satisfied, the V2X vehicle generates the CPM message in S23140.

When the trigger condition is not satisfied, the V2X vehicle determines whether to transmit the CPM message through a comparison with an upper bound of a transmission interval in S23130. That is, if the upper bound (e.g., 1000 ms) of the transmission interval passes after the CPM message is previously transmitted, the V2X vehicle may generate the CPM message.

The CPM message generated in the step S23140 may be generated as a packet while passing through the networks and transport layer and the access layer in S23150 and S23160, and may be transmitted wirelessly. Afterwards, if the system is not terminated, the V2X vehicle may periodically provide CPS service by acquiring again sensor information.

FIG. 24 illustrates an example of a block diagram of a V2X communication device according to an embodiment of the present disclosure.

With reference to FIG. 24, configuration of a multi-level triggering system 100 using a state of an object is illustrated. Signals (or data) sensed through sensors 111, 112, . . . , 11N mounted on a vehicle are transferred to a sensor collection/fusion block 120, and the sensor collection/fusion block 120 extracts the object.

Obtained object information is combined with vehicle location information and previous object information via a database 130 of the vehicle. A condition value (or state value) calculation block 140 calculates difference values of a moving orientation, a position, a speed, and a distance based on state information of the object. An object split block 150 transfers the objects by splitting the objects into vehicle and VRU. The object split block 150 may classify the objects into the vehicle and a remainder (e.g., VRU) other than the vehicle as described above with reference to FIGS. 21 to 23.

When there is a plurality of objects, an object selection block 160 determines (or induces) a representative value of difference values of states of the plurality of objects. Specifically, an average block 161 may calculate an average value of the respective difference values, and a maximum block 162 may calculate a maximum value of the respective difference values.

The selected difference value is transferred to a trigger block 170, and a transmission interval Tinterval is finally determined. The transmission interval Tinterval may also be calculated based on the difference values through a hard triggering block 171 that is based on the above-described thresholds, and the transmission interval Tinterval may also be through a soft triggering block 172 that is implemented by an equation. The thresholds and the alpha value used in the present disclosure may be received through a parameter block 180. A selection block 173 finally selects one of two values. Afterwards, the selected value may be triggered at an early time among a time triggered in the vehicle and a time triggered in the VRU, and the CPM message may be generated/transmitted.

FIG. 25 illustrates configuration of a V2X communication device according to an embodiment of the present disclosure. As described above, the V2X communication device may be referred to as a V2X communication device, a V2X device, etc.

In FIG. 25, a V2X communication device 25000 may include a communication unit 25010, a processor 25020, and a memory 25030.

The communication unit 25010 is connected to the processor 25020 and may transmit/receive a radio signal. The communication unit 25010 may up-convert data received from the processor 25020 into a transmission/reception band to transmit a signal, or may down-convert the received signal. The communication unit 25010 may implement at least one operation of the physical layer or the access layer.

The communication unit 25010 may include a plurality of sub-RF units in order to perform communication according to a plurality of communication protocols. In embodiments, the communication unit 25010 may perform data communication based on ITS-G5 wireless communication technology based on a physical transmission technology of dedicated short range communication (DSRC), IEEE 802.11 and/or 802.11p standard, and IEEE 802.11 and/or 802.11p standard, 2G/3G/4G(LTE)/5G wireless cellular communication technology including satellite/wideband wireless mobile communication, wideband terrestrial digital broadcasting technology such as DVB-T/T2/ATSC, GPS technology, IEEE 1609 WAVE technology, and the like. The communication unit 25010 may include a plurality of transceivers that implement the respective communication technologies.

The processor 25020 is connected to the RF unit and may implement operations of the layers of the V2X communication device. The processor 25020 may be configured to perform operations according to various embodiments of the present disclosure according to the figures and the description described above. Furthermore, at least one of a module, data, a program or software that implements operations of the V2X communication device 25000 according to various embodiment of the present disclosure may be stored in the memory 25030 and executed by the processor 25020.

The memory 25030 is connected to the processor 25020 and stores a variety of information for driving the processor 25020. The memory 25030 may be included inside the processor 25020 or installed outside the processor 25020, and may be connected to the processor 25020 by known means.

The processor 25020 of the V2X communication device 25000 may perform the generation and transmission of a CPM described in the present disclosure. A method of generating and transmitting the CPM by the V2X communication device 25000 is described below.

FIG. 26 is a flow chart illustrating a method for a V2X communication device to send an ITS message in accordance with an embodiment of the present disclosure. In an embodiment of FIG. 26, a V2X communication device may be a V2X communication device of a vehicle. The vehicle has a sensor mounted thereon and may detect a surrounding object using the sensor.

The V2X communication device detects at least one surrounding object in S26010.

The V2X communication device generates a collective perception (CP) message including information on the detected object, based on whether a state of the detected object satisfies a preset trigger condition of the CP message in S26020.

The V2X communication device transmits the generated CP message in S26030. In this instance, the CP message may be transmitted when the state of the detected object satisfies the trigger condition, or may be transmitted when the state of the detected object does not satisfy the trigger condition and a specific time has passed after the previously transmitted CP message is generated.

In embodiments, the trigger condition may be satisfied when a moving orientation change of the detected object exceeds a first threshold, when a position change of the detected object exceeds a second threshold, or when a speed change of the detected object exceeds a third threshold, based on a time at which the previously transmitted CP message is generated.

In embodiments, the trigger condition may be satisfied when a moving orientation difference between the detected object and the vehicle exceeds a fourth threshold, when a distance between the detected object and the vehicle exceeds a fifth threshold, or when a speed difference between the detected object and the vehicle exceeds a sixth threshold.

In embodiments, the step S26020 may comprise, when the detected object includes a plurality of objects, checking whether the trigger condition of the CP message is satisfied based on an object having an average value of the detected objects or a maximum value of the detected objects.

In embodiments, the step S26020 may further comprise determining a transmission interval of the CP message, and the transmission interval of the CP message may be determined based on a distance between the detected object and the vehicle and at least one of a plurality of preset thresholds.

In embodiments, the transmission interval of the CP message may be determined based on the trigger condition that is differently set depending on a classification of the object.

In the aforementioned embodiments, the elements and characteristics of the present disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present disclosure. The sequence of the operations described in embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

Embodiments according to the present disclosure may be implemented by various means, for example, hardware, firmware, software or a combination of them. In the case of an implementation by hardware, embodiments of the present disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, embodiments of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative, but should be construed as being illustrative from all aspects. The scope of the present disclosure should be determined by reasonable analysis of the attached claims, and all changes within the equivalent range of the present disclosure are included in the scope of the present disclosure.

MODE FOR INVENTION

Those skilled in the art will understand that the present disclosure may be changed and modified in various ways without departing from the spirit or scope of the present disclosure. Accordingly, the present disclosure is intended to include all the changes and modifications provided by the appended claims and equivalents thereof.

In this disclosure, both the apparatus and the method have been described, and the descriptions of both the apparatus and method may be complementarily applied.

Various embodiments have been described in the best form for implementing the present disclosure.

INDUSTRIAL APPLICABILITY

The present disclosure is used in a series of V2X communication fields.

Those skilled in the art will understand that the present disclosure may be changed and modified in various ways without departing from the spirit or range of the present disclosure. Accordingly, the present disclosure is intended to include all the changes and modifications provided by the appended claims and equivalents thereof.

The invention claimed is:

1. A method of transmitting a message of a vehicle, the method comprising:
   detecting surrounding objects;
   determining a preset trigger condition of a safety message is satisfied;
   generating, based on the preset trigger condition for the safety message being satisfied, the safety message;
   grouping the surrounding objects into a vehicle group and a VRU (Vulnerable road user) group;
   determining a transmission interval of the vehicle group and a transmission interval of the VRU group;
   selecting a transmission interval of the safety message among the transmission interval of the vehicle group and the transmission interval of the VRU group; and
   transmitting, based on the transmission interval of the safety message, the safety message.

2. The method of claim 1, wherein the trigger condition is satisfied 1) based on a moving orientation change of the detected objects exceeding a first threshold, 2) based on a position change of the detected objects exceeding a second threshold, or 3) based on a speed change of the detected objects exceeding a third threshold, based on a time at which a previously transmitted safety message is generated.

3. The method of claim 1, wherein the trigger condition is satisfied 1) based on a moving orientation difference between the detected objects and the vehicle exceeding a first threshold, 2) based on a distance between the detected objects and the vehicle exceeding a second threshold, or 3) based on a speed difference between the detected objects and the vehicle exceeding a third threshold.

4. The method of claim 1, wherein detecting the surrounding objects and generating the safety message further comprises:
   checking whether the trigger condition of the safety message is satisfied based on an average value of the detected objects or a maximum value of the detected objects.

5. The method of claim 1, wherein the safety message is a CPM (collective perception message) including information on the detected object.

6. The method of claim 1, wherein the safety message is generated based on the state of the detected object satisfying the trigger condition, or is generated based on the state of the detected object not satisfying the trigger condition and a specific time having passed after the previously transmitted safety message is generated.

7. A communication device of a vehicle comprising:
   a memory configured to store data;
   a transceiver configured to transmit and receive a radio signal including a safety message; and
   a processor configured to control the memory and the transceiver,
   wherein the processor is configured to:
   detect surrounding objects;
   determine a preset trigger condition for a safety message is satisfied;
   generate, based on the preset trigger condition for the safety message being satisfied, the safety message;
   group the surrounding objects into a vehicle group and a VRU (Vulnerable road user) group;
   determine a transmission interval of the vehicle group and a transmission interval of the VRU group;
   select a transmission interval of the safety message among the transmission interval of the vehicle group and the transmission interval of the VRU group; and
   transmit, based on the transmission interval of the safety message, the safety message.

8. The communication device of claim 7, wherein the trigger condition is satisfied 1) based on a moving orientation change of the detected objects exceeding a first threshold, 2) based on a position change of the detected objects exceeding a second threshold, or 3) based on a speed change of the detected objects exceeding a third threshold, based on a time at which a previously transmitted safety message is generated.

9. The communication device of claim 7, wherein the trigger condition is satisfied 1) based on a moving orientation difference between the detected objects and the vehicle exceeding a first threshold, 2) based on a distance between the detected objects and the vehicle exceeding a second threshold, or 3) based on a speed difference between the detected objects and the vehicle exceeding a third threshold.

10. The communication device of claim 7,
    wherein the processor is further configured to check whether the trigger condition of the safety message is satisfied based on an average value of the detected objects or a maximum value of the detected objects.

* * * * *